(12) United States Patent
Kano et al.

(10) Patent No.: US 7,441,029 B2
(45) Date of Patent: Oct. 21, 2008

(54) STORAGE SYSTEM MANAGING DATA THROUGH A WIDE AREA NETWORK

(75) Inventors: Yoshiki Kano, Yokohama (JP); Manabu Kitamura, Yokohama (JP); Takashige Iwamura, Yokohama (JP); Kenichi Takamoto, Odawara (JP)

(73) Assignee: Hitachi, Ltd.., Tokyo (JP)

( * ) Notice: Subject to any disclaimer, the term of this patent is extended or adjusted under 35 U.S.C. 154(b) by 780 days.

(21) Appl. No.: 10/124,401

(22) Filed: Apr. 18, 2002

(65) Prior Publication Data
US 2003/0163568 A1 Aug. 28, 2003

(30) Foreign Application Priority Data
Feb. 28, 2002 (JP) ............................. 2002-052620

(51) Int. Cl.
*G06F 15/173* (2006.01)
(52) U.S. Cl. .................. 709/225; 709/217; 709/218; 709/219; 711/114; 711/156; 711/163; 707/205
(58) Field of Classification Search ......... 709/217–219; 707/2, 10, 205; 711/114, 156, 163
See application file for complete search history.

(56) References Cited

U.S. PATENT DOCUMENTS

| | | | | |
|---|---|---|---|---|
| 5,903,913 | A * | 5/1999 | Ofer et al. ................... | 711/156 |
| 6,209,059 | B1 * | 3/2001 | Ofer et al. ................... | 711/114 |
| 6,263,445 | B1 * | 7/2001 | Blumenau ..................... | 726/2 |
| 6,389,432 | B1 * | 5/2002 | Pothapragada et al. ...... | 707/205 |
| 6,487,547 | B1 * | 11/2002 | Ellison et al. ................ | 707/2 |
| 6,640,278 | B1 | 10/2003 | Nolan et al. | |
| 6,654,830 | B1 | 11/2003 | Taylor et al. | |
| 6,691,245 | B1 * | 2/2004 | DeKoning ..................... | 714/6 |
| 6,697,846 | B1 * | 2/2004 | Soltis .......................... | 709/217 |
| 6,718,347 | B1 * | 4/2004 | Wilson ......................... | 707/201 |
| 6,718,372 | B1 * | 4/2004 | Bober .......................... | 709/217 |
| 6,728,840 | B1 * | 4/2004 | Shatil et al. .................. | 711/137 |
| 6,766,397 | B2 * | 7/2004 | O'Hare et al. ............... | 710/200 |
| 6,826,580 | B2 * | 11/2004 | Harris et al. ................. | 707/202 |
| 6,826,582 | B1 * | 11/2004 | Chatterjee et al. ........... | 707/205 |
| 6,859,812 | B1 * | 2/2005 | Poynor ......................... | 707/203 |
| 6,868,417 | B2 * | 3/2005 | Kazar et al. .................. | 707/10 |
| 6,898,727 | B1 * | 5/2005 | Wang et al. .................. | 714/4 |
| 6,961,828 | B2 * | 11/2005 | Hirayama ..................... | 711/150 |

(Continued)

FOREIGN PATENT DOCUMENTS

| | | |
|---|---|---|
| JP | 11-007404 | 12/1999 |
| JP | 2001-184294 | 6/2001 |
| WO | WO 01/98906 A2 | 12/2002 |

*Primary Examiner*—Bunjob Jaroenchonwanit
*Assistant Examiner*—Duyen Doan
(74) *Attorney, Agent, or Firm*—Mattingly, Stanger, Malur & Brundidge, P.C.

(57) ABSTRACT

In a storage system, a server apparatus and a storage apparatus are provided, while the server apparatus is connected via a LAN to one, or plural sets of computers so as to accept an access request of file data issued from the computers, whereas the storage apparatus is connected via a wide area network to the server apparatus so as to store thereinto the file data. A communication between the computers and the server apparatus is carried out by employing a network file protocol, whereas a communication between the server apparatus and the storage apparatus is performed by employing a block device protocol. The server apparatus and the storage apparatus are connected via the respective security protecting apparatus to the wide area network.

12 Claims, 19 Drawing Sheets

U.S. PATENT DOCUMENTS

| | | | | |
|---|---|---|---|---|
| 6,965,924 | B1* | 11/2005 | Gerthe | 709/218 |
| 6,977,927 | B1* | 12/2005 | Bates et al. | 370/381 |
| 2002/0083120 | A1* | 6/2002 | Soltis | 709/200 |
| 2002/0112022 | A1* | 8/2002 | Kazar et al. | 709/217 |
| 2002/0129216 | A1* | 9/2002 | Collins | 711/170 |
| 2002/0161855 | A1* | 10/2002 | Manczak et al. | 709/219 |
| 2002/0161982 | A1* | 10/2002 | Riedel | 711/170 |
| 2002/0165941 | A1* | 11/2002 | Gahan et al. | 709/219 |
| 2002/0178143 | A1* | 11/2002 | Fujimoto | 707/1 |
| 2003/0105767 | A1* | 6/2003 | Sonoda et al. | 707/100 |
| 2003/0115447 | A1* | 6/2003 | Pham et al. | 713/153 |
| 2004/0233910 | A1* | 11/2004 | Chen et al. | 370/395.5 |

* cited by examiner

STORAGE SYSTEM MANAGING DATA THROUGH A WIDE AREA NETWORK

BACKGROUND OF THE INVENTION

The present invention relates to a storage system for managing data used by a computer. More specifically, the present invention is directed to a storage system for managing data through a wide area network, and a method for holding/managing files of the data.

Very recently, since information technology has advantageously progressed, amounts of data which are produced in enterprises are considerably increased. For instance, since data are formed in individual divisions/departments of a firm, managements of these formed data are necessarily carried out in these respective divisions/departments within this firm. As one example of data managements executed in enterprises, backup operations of formed data are carried out. In a backup operation, for example, important information (data) on business activities which have been stored in a magnetic disk apparatus are copied, or duplicated on a secondary storage apparatus such as a tape storage device from the magnetic disk apparatus. Frequency degrees of executions of such backup operations are considerably increased while amounts of data are increased.

Since such data managements are carried out in an intensive manner, data can be managed in a centralizing manner, so that cost required for managing data in enterprises can be reduced. As one example, while data are distributed to individual divisions/departments in a firm, backup operations of these distributed data are carried out every day in the respective divisions/departments. In contrast to this example, when information (data) is centralized so as to be managed in an intensive manner, a higher efficiency may be achieved as to data management aspects.

High reliable large-scale storage subsystems typically known as a RAID (redundant arrays of inexpensive disk) have been marketed as apparatus suitable for centralizing information. In such a RAID, since a storage area having a capacity of several tera-bytes is subdivided into a plurality of small logical storage regions, information as to each of small groups can be combined with each other to form one information group in an intensive manner. While such a feature owned by RAID is utilized, data which have been distributed/managed in individual divisions/departments of an enterprise could be managed in an centralizing manner in a large-scaled computer center and the like installed in an information processing department of this enterprise.

A trend of the above-described data centralizing management is extended over data centralizing managements of enterprises. Currently, service providers are coming out in a market, while these service providers manage data owned by a plurality of enterprises in a data center in an outsourcing manner. In such a data center, the following aspect is necessarily required. That is, data owned by a plurality of enterprises must be managed in safety and quick manners. Therefore, such a means capable of more easily managing information is required in a data center. However, while a storage area is employed as a block unit, data are handled in a RAID, so that a manager of such a data center can hardly manage these data.

On the other hand, a file server called as a "network attached storage" (abbreviated as an "NAS") has been proposed as an apparatus capable of referring to data from a plurality of hosts, while difficulties of the data managements in the unit of block may be compensated. In this NAS, such an access operation can be carried out by employing such a network protocol as to the NFS (network file system) and the CIFS (common internet file system), while a personal computer (PC) and a workstation (WS) are equipped with these NFS and CIFS. As a result, data managements can be carried out in the unit of file, so that the data can be managed in a easier manner, as compared with the data management executed in the unit of block.

SUMMARY OF THE INVENTION

The network file protocols handled by the NAS have been constructed under such an initial condition that these network file protocols are necessarily used in a local area network (LAN). Under such a circumstance, when a wide area network (WAN) is applied as this network of the NAS, access operations to files cannot be carried out under stable condition because of delays in access operations which are caused by distances. As a result, there are certain possibilities that data may be destroyed. As a consequence, in such a case that an enterprise employs such an NAS, it is practically difficult that managements of storage apparatus are handled by an outsourcing-service provider such as a data center. In addition, there are many possibilities that large numbers of security protection apparatus such as firewalls are provided in multiple stages in either the enterprise or the data center in order to prevent illegal accesses from a wide area network. As a consequence, even when the NAS is managed in the data center, it is practically very difficult that a connection is made from personal computers (PCs) of the enterprise into the NAS installed in the data center.

An object of the present invention is to provide such a means by which while a safe logical communication is established between NAS servers and a data center connected via a wide area network to these NAS servers, a storage apparatus (storage subsystem) provided in the data center can be used by the NAS servers, and also data stored in the data center are shared among a plurality of NAS servers.

A storage system, according to the present invention, is featured by comprising a server apparatus and a storage apparatus, while the server apparatus is connected via a LAN to one, or plural sets of computers so as to accept an access request of file data issued from these computers, whereas the storage apparatus is connected via a wide area network to the server apparatus so as to store thereinto the file data. The server apparatus accesses the file data stored in the storage apparatus in response to the access request issued from the computer.

In a storage system according to a preferred embodiment mode of the present invention, a communication between the computers and the server apparatus is carried out by employing a network file protocol, and a communication between the server apparatus and the storage apparatus is performed by employing a block device protocol. The server apparatus and the storage apparatus are connected via the respective security protecting apparatus to the wide area network.

In a storage system according to an aspect of the present invention, a server apparatus is equipped with an internal storage apparatus which is directly connected to the own apparatus. While the server apparatus holds management information as to file data which are stored in both an external storage apparatus and the internal storage apparatus, this server apparatus judges a storage position of such file data to be accessed in response to an access request issued from a computer, and then, accesses either the external storage apparatus or the internal storage apparatus.

In another storage system according to another aspect of the present invention, a plurality of server apparatus and a server management apparatus are provided, while this server management apparatus is connected via a wide area network to these plural server apparatus. While the server management apparatus holds such management information used to manage storage apparatus which are shared by the plural server apparatus, this serve management apparatus manages conditions of the storage apparatus shared among these server apparatus.

The management information is set up by a manager before the storage apparatus are commonly shared by these server apparatus. When each of these server apparatus accepts an access request to such a storage apparatus which is commonly shared by the own server apparatus and another server apparatus from a computer, this server apparatus requests the server management apparatus to allow an access operation. In response to this access permission request, the server management apparatus checks as to whether or not the server apparatus of the access request source is allowed to share the storage apparatus. When the access request is allowed to this server apparatus, the server management apparatus allows this server apparatus to perform the access operation, and notifies a storage position of file data to be accessed to this server apparatus. Then, this1 server apparatus may access the subject file data based upon the received storage position.

Other objects, features and advantages of the invention will become apparent from the following description of the embodiments of the invention taken in conjunction with the accompanying drawings.

DESCRIPTION OF THE EMBODIMENTS

Figure 1:
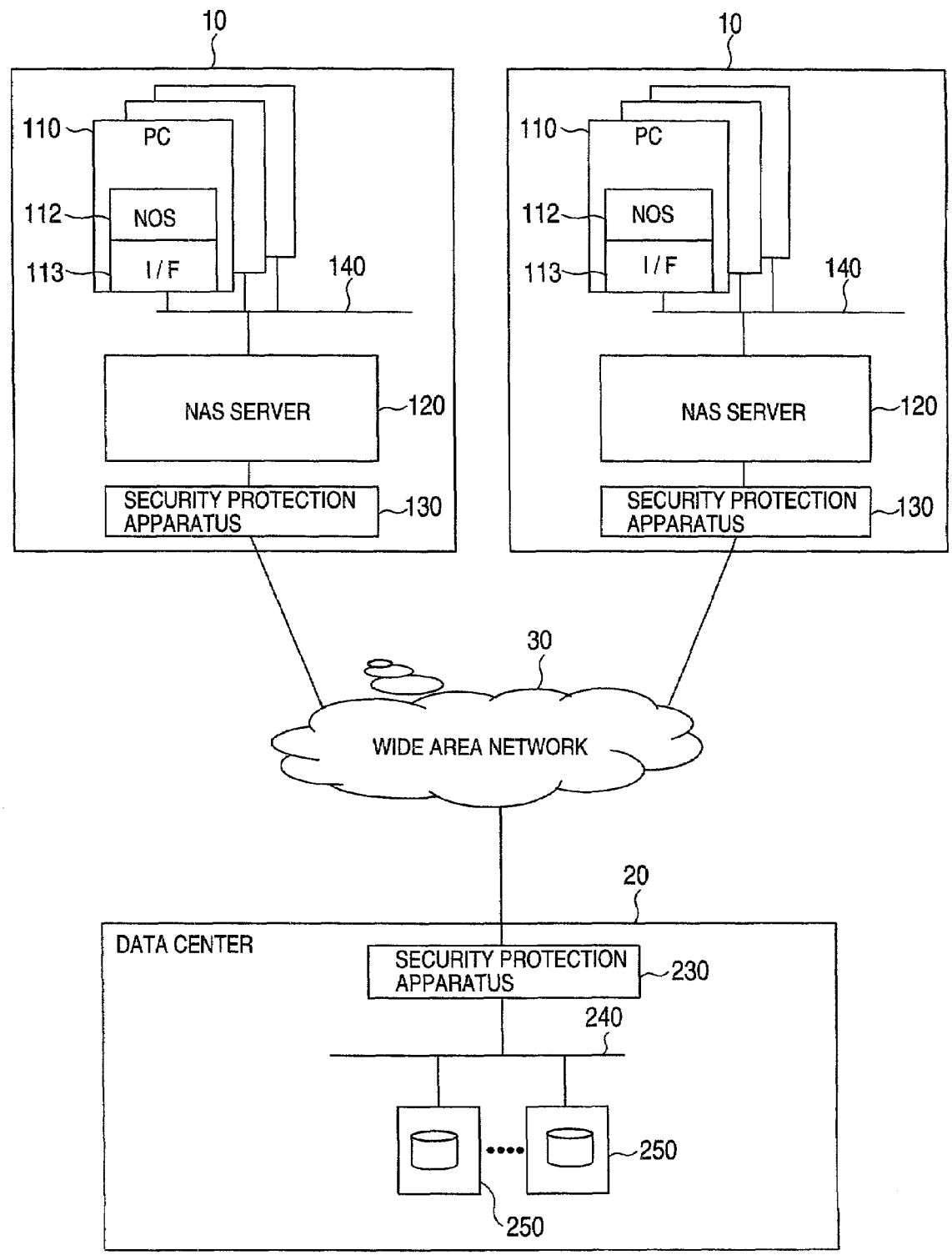
FIG. 1 is a schematic block diagram for showing an arrangement of a computer system according to an embodiment, to which the present invention is applied.

FIG. 1 is a schematic block diagram for indicating an arrangement of a computer system according to a first embodiment, to which the present invention is applied.

The computer system of this first embodiment owns such an arrangement as follows: That is, both a computer system 10 provided in an enterprise, and another computer system which constitutes a data center 20 are mutually connected to each other via a wide area network 30, while the data center 20 manages data which are used by either one or plural sets of in-house computer systems 10. In this case, the expression "wide area network" 30 implies such a network in which a communication path can be commonly shared, or owned by a plurality of users, while this network is known as an IP network (Internet), an ATM (Asynchronous Transfer Mode) network, and a public network. In general, both the in-house computer system 10 and the data center 20 are installed at physically separated places, or geographically separated places.

The in-house computer system 10 contains a plurality of personal computers (PCs) 110, an NAS server 120, a security protection apparatus 130, and a local area network (LAN) 140 which is used to mutually connect the PCs 110 with the NAS server 120. This in-house computer system 10 is connected to the wide area network 30 by the security protection apparatus 130.

Each of the PCs 110 is equipped with an interface 112 used to connect this PC 110 to a network, and a network operating system (NOS) 113 by which a network file system can be utilized in correspondence with a CIFS protocol and an NFS protocol. Each of the PCs 110 is further provided with a CPU, a memory, an input/output device, and the like. However, since these devices are not directly related to the present invention, these devices are not shown in the drawing. Normally, the NOS 113 and other programs, which are executed on the PCs 110, may be stored into storage devices owned by the PCs 110. Alternatively, while the NOS 113 and other programs are stored into a storage area provided by the NAS server 120, these programs may be loaded on the memories of the PCs 110 when these programs are executed.

The NAS server 120 may provide a storage area which is used by the PC 110 with respect to the PC 110. The PC 110 may utilize the storage area of the NAS server 120 by employing a network file system such as an NFS and a CIFS. This storage area may be constituted by a magnetic disk apparatus.

A connection between the LAN 140 and the wide area network 30 may be realized by employing several connection modes. In this embodiment, the connection between the LAN 140 and the wide area network 30 is carried out via a security protection apparatus while both the security protection apparatus 130 and 230 can avoid an invasion into a system and destruction of the system which are caused by unnecessary accesses from the wide area network 30, these security protection apparatus 130/230 can establish a communication by avoiding eavesdropping, alternations, and spoofing of data which is transferred between the computer system 10 and the data center 20. Concretely speaking, in order to prohibit an unspecified access from the wide area network 30, the security protection apparatus 130 blockades such ports except for ports which are utilized between the security protection apparatus 130 and 230 among the ports which indicate communication paths to the respective services in a TCP/IP, and then, such a communication path is prepared while this communication path has been encrypted by employing the ports utilized between the security protection apparatus 130 and 230. The encryption may be carried out by employing identification information, while this identification information contains an encrypt key preset in each of the security protection apparatus, a lifetime of an encrypt key, a certification algorithm, and either an IP address or a host name of a countersided security protection apparatus. As one example of a protocol used to encrypt a communication path, there is an IPSec, and this IPSec is provided with an apparatus connected from a LAN to a WAN.

An access operation from the LAN 140 of the computer system 10 to the LAN 240 of the data center 20 is performed by employing such a communication path which has been encrypted, as explained above, (will be referred to as an "encrypted communication path" hereinafter). Also, when an access operation from the LAN 240 via the wide area network 30 to the LAN 140 is carried out in an opposite sense, another encrypted communication path established between the security protection apparatus 130 and 230 is employed.

In this embodiment, the security protection apparatus 130 is directly connected to the NSA server 120. Alternatively, if the NAS server 120 is so arranged to be communicated with an external device via the security protection apparatus 130, then this security protection apparatus 130 may be connected to the LAN 140.

The data center 20 contains the security protection apparatus 230 connected to the wide area network 30, and either one or plural sets of storage subsystems 250 which constitute the storage areas of the NAS server 120. The security protection apparatus 230 and the storage subsystems 250 are mutually connected via the LAN 240 to each other.

The storage subsystem 250 is constituted by containing a disk apparatus for saving therein data, and a control apparatus for controlling this disk apparatus. This storage subsystem 250 may provide a logical unit (LU) corresponding to a logical storage apparatus which constitutes a storage area. In order to provide a logical unit (LU) to such an apparatus as the NAS server 120, the storage subsystem 250 owns a protocol such as an iSCSI by which a SCSI protocol can be transferred via the LAN 240 to a network using TCP/IP protocol.

Figure 2:
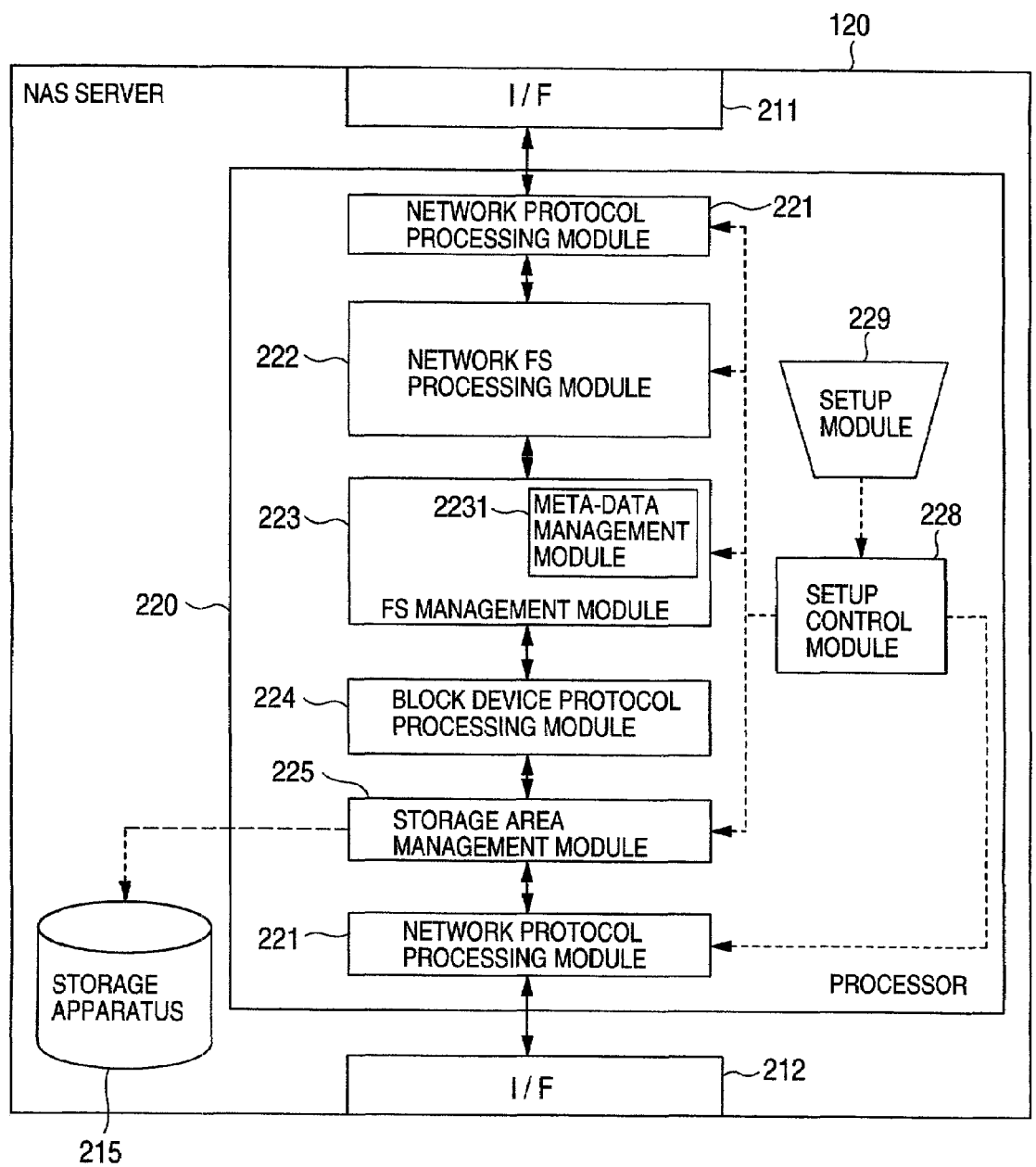
FIG. 2 is a functional block diagram for indicating an arrangement of an NAS server.

FIG. 2 is a functional block diagram for indicating an internal arrangement of the NAS server 120. The NAS server 120 is arranged by containing a processor 220, network interfaces 211 and 212, and a storage apparatus 215.

The NAS server 120 is connected to the LAN 140 by the network interface 211, and is connected to the security protection apparatus 130 by the network interface 212. The processor 220 grasps a transmission source of data which is acquired in a communication which is carried out via the network interfaces 211 and 212, and confirms operation information to a file so as to execute a process operation to a storage area.

The processor 220 contains a network protocol processing module 221, a network file system processing module (network FS processing module) 222, a file system management module (FS management module) 223, a block device protocol processing module 224, a storage area management module 225, a security module 227, a setup control module 228, and also, a setup module 229. The functions of the respective modules contained in the processor 220 may be realized by executing a program process operation on the processor 220.

The network protocol processing module 221 executes a process operation in accordance with the protocol of the TCP/IP so as to confirm a transmission source from data acquired from either the network interface 211 or the network interface 212, and performs such a communication capable of guaranteeing transmission data.

The network FS processing module 222 processes file operation which is transferred from the PC 110 via the LAN 140 to the own module 222, and executes a process operation to such a file system managed by the FS management module 223. In the processing operation of the file operation, the network FS processing unit 223 executes an actual operation to the file system only as to such a directory to which a export management table has been permitted (will be discussed later). The network FS processing unit 222 returns an error as to such a directory to which the export management table has not yet been permitted.

The file operation contains an operation of "Lookup" for retrieving as to whether not a file is present based upon a given directory and given file information, an operation of "Read" for performing a read operation with respect to the retrieved file in the unit of a byte, and an operation of "Write" for similarly executing a write operation with respect to the retrieved file, and so on. As an example of a network processing module for executing such a file operation, there is an NFS server and a CIFS server.

The FS management module 223 manages a structure of a file system based upon a super block indicative of a construction of a file system recorded in an LU provided form either the storage apparatus 215 or the storage subsystem 250, an "i-node" for constructing a file, and a block for recording thereon data and directory information contained in a file system. In order to indicate the construction of the file system, the super block contains an i-node number within the file system, a block number, a logical block address (LBA) of a utilizable starting area of the block, and also a magic number indicative of a mode of a format of the file system.

The i-nodes are stored within the file system in a sequential order. An "i-node" involves a mode used to set a protection access right of a file, an owner of the file, a file size, a final updating time instant to the file, a total link number to the file, an accessible group, and also, information related to a link to a block where data is contained. In a case of a file, a file name is described in one of blocks. In a case of a directory, such information is stored in a logical block contained in a storage apparatus, while this information corresponds to either all of file names or all of directory names, which exist in this directory, and i-node numbers corresponding to the names thereof in an one-to-one correspondence relationship.

The FS management module 223 may mount a plurality of file systems every LU (Logical unit) on a file system contained in a designated NAS sever 120 based upon a file system management table (will be explained later). When a file system is mounted, a place where this file system is mounted, an LU, and a disk identifier indicative of a place used to manage the file system are recorded on a memory as a file-system mounted list. A place used to manage a file system corresponds to such a memory area contained in an NAS server 120 for storing a super block of a file system, an "i-node", and block information. In this embodiment, a meta-data management module 2231 executes this management. It should be noted that both i-node of information of a file and block information may be cached into a memory contained in an NAS server in order to realize a high-speed access operation.

Furthermore, the FS management module 223 executes a file operation instructed from a network processing module 222. This file operation contains a file retrieving process for executing "Lookup", a file open process for setting an identifier by which an operation of a retrieved file is exclusively determined, and reading/writing processes for actually executing an access operation to a file from an identifier. Alternatively, this file operation may include a process operation for changing information contained in i-node. While the FS management module 223 contains a meta-data management module 2231 for executing an access control operation of a file by using this i-node, the FS management module 223 guarantees data consistency in the case that access operations are carried out from a plurality of PCs 110 to one file at the same time.

The block device protocol processing module 224 executes process operations of such an operation to a storage area instructed by the FS management module 223 in accordance with the protocol of SCSI. A process operation instructed from the FS management module 223 is subdivided into two process operations. A first process operation corresponds to read/write instructions with respect to information of i-node, and a second process operation corresponds to read/write instructions with respect to information of a block. The read operation corresponds to "Read" of the SCSI protocol, and the write instruction corresponds to "Write" of this SCSI protocol. In this embodiment, the information of i-node is stored into the storage apparatus 215 employed in the NAS server 120 in order to more quickly retrieve and further fastly update a file. On the other hand, the information of the block is stored into the storage subsystem 250 provided on the remote side.

The storage area management module 225 detects such an apparatus which constitutes a storage apparatus and manages the detected storage apparatus, and also executes an instruction issued from the device block protocol processing module 224 with respect to an LU of an instruction destination. A detection of a storage apparatus is carried out by employing the method for detecting the LU of the SCSI protocol as to the local storage apparatus 215. Also, the detection of the storage subsystem 250 provided in the data center 20 is carried out in accordance with the iSCSI protocol in such a manner that after a communication path has been established between the NAS server 120 and the LAN 240 provided in the data center 20, both an IP address to the storage subsystem and an iSCSI name to the LU on the storage subsystem are employed. The detected storage subsystem may be utilized as a local LU (logical unit), or an LU every data center 20. The storage area management module 225 executes an instruction of SCSI which designates either the local LU or the LU of the data center 20 under management in response to the instruction issued from the device block protocol processing module 224.

The setup control module 228 manages the network protocol processing module 221, the network FS processing module 222, the FS management module 223, and also, the storage area management module 225 in a united manner.

The setup module 229 inputs a parameter used in a setup operation with respect to the setup control module 228.

In order to record such information related to setup operations of other various modules, the setup control module 228 owns a disk management table, a connection path management table, a security protection apparatus management table, a file system management table, and also, a file access management table.

The disk management table is utilized by the block protocol processing module 224. Every time an LU is provided via the wide area network 30 from the storage subsystem 250, the disk management table holds thereinto information such as a disk identifier corresponding to a unique name thereof, an IP address indicative of a location of the LU on a network, and an iSCSI name of a storage apparatus accessed after being connected to the LU.

The connection path management table is utilized by the storage area management module 225. In this connection path management table, an IP address of the storage subsystem 250 and the like, and further, either IP addresses or host names of security protection apparatus which are provided on paths defined from the computer systems 10 to the data center are registered. In this embodiment, when an access operation is performed from the security protection apparatus 140 of the computer system 10 to the data center 20, a total number of such a security protection apparatus is equal to 1. However, in the case that a plurality of security protection apparatus are present, this connection path management table contains either plural IP addresses or plural host names, the total number of which is equal to a total number of these plural security protection apparatus.

In this security protection apparatus management table, certification information is registered in correspondence with either an IP address or a host name of each of security protection apparatus, while the certification information is employed in a certification process operation executed in the relevant security protection apparatus.

The file system management table is utilized in the FS management table 223, and contains information of a file system which is mounted in the NAS server 120. In this information, there are described a disk identifier of an LU for storing a file system, and a place where the file system of the LU indicated by this disk identifier is mounted. For example, assuming now that the disk identifier corresponds to "/dev/sd0a", and also, the place used to mount the file system of the LU corresponds to "/mnt", since a root file system is present as "/" in the NAS server 120, the file system contained in "/dev/sd0a" is mounted on such a directory called as "mnt." Alternatively, other information may also be described in this file system management table, namely, a management method of file systems in the NAS server 120 may be described. For example, a format of a file system may be described; a file system used to be mounted by read-only, or read and write methods may be described; and a recovering method of a file system may be described. It should also be noted that since these items are not directly related to the present invention, explanations thereof are omitted.

The export management table is utilized by the network FS processing module 222, and indicates a directory in which operations of file operations from a plurality of PCs 110 are allowed to be executed by the NAS server 120. This is referred to as an "export." Also, this export management table may alternatively contain such information indicative of an operation allowable host, and such information representative of an operation not-allowable host in order to manage as to whether a file operation is allowable, or not allowable, within a directory with respect to a specific PC 110.

The file access management table is provided on a memory of the NAS server 120, and contains such information used to manage an access condition of a file. Concretely speaking, this file access management table is used so as to manage the file operations from a plurality of PCs 110 executed by the network FS processing module 222 in the meta-data management module 2231.

In order to execute a management of file operations, the file access management table contains file names and file identifiers of the respective files, and both an "i-node" number and an active item for holding such information indicative of such a PC 110 which refers to a file every file identifier. Also, the file access management table manages a history of files which have been once accessed and utilizes this history when cache operation of "i-node" is carried out.

The block device protocol processing module 225 uses such a protocol as the SCSI protocol by which storage apparatus can be accessed in the unit of a block. In this case, such an iSCSI is employed in which the SCSI is used with respect to the internal storage apparatus 215 of the NAS server 120, whereas the TCP/IP is used as a communication path with respect to the storage subsystem 250 which is accessed via the wide area network 30.

The network interfaces 211 and 212 correspond to such interfaces which are used to transfer data whose reliability is guaranteed by employing the communication path of the TCP/IP formed on either the LAN or the wide area network.

The storage apparatus 215 constitutes a file system by an NAS server, and provide a file access issued from the PC 110 via the LAN. In this embodiment, the storage apparatus 215 is explained as a magnetic disk apparatus. Alternatively, as a storage apparatus, such a solid disk apparatus that a semiconductor element such as a flash ROM is employed as a storage medium, and/or an RAID apparatus which is arranged by a plurality of disk apparatus may be employed.

Figure 4:
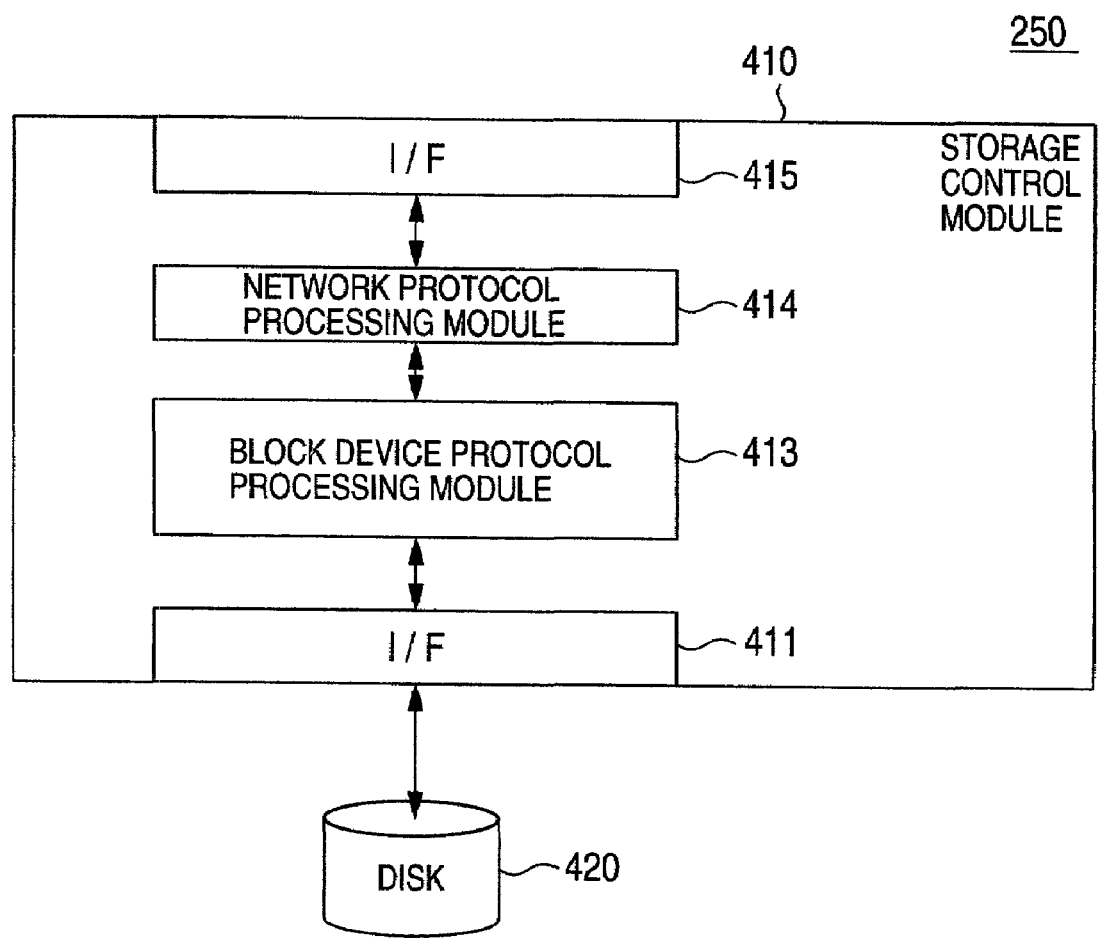
FIG. 4 is a functional block diagram for simply showing an arrangement of a storage subsystem 250.

FIG. 4 is a functional block diagram for simply indicating a structure a structure of the storage subsystem 250. The storage subsystem 250 contains a magnetic disk apparatus 420 for storing thereinto data, and a storage control apparatus 410 for controlling an access operation to the magnetic disk apparatus 420. The storage control apparatus 410 contains a network interface 415 for connecting this storage control apparatus 410 to the LAN 240, a network protocol processing module 414, a block device protocol processing module 413, and a channel interface (channel I/F) 411 used to connect this storage control apparatus 410 via a fiber channel (FC), the SCSI, or the like to the disk apparatus 420.

The network protocol processing module 414 processes such a message transmitted via the LAN 240 in accordance with such a protocol as TCP/IP on the LAN 240 so as to interpret an access request. Also, the network protocol processing module 414 transmits such data read out from the magnetic disk apparatus to the LAN 240 as the message formed in accordance with the protocol on the LAN 240.

The block device protocol processing module 413 extracts an operation to the disk apparatus 420 from an access request sent via the LAN 240, and accesses data stored in the magnetic disk apparatus 420 via the channel interface 411.

The storage subsystem 250 may be realized by such a storage subsystem using a single unit of the magnetic disk apparatus 420, and furthermore, by a storage subsystem such as a disk array with employment of a plurality of magnetic disk apparatus while a storage area of one set of the magnetic disk apparatus 420 is subdivided into a plurality of storage areas, the storage control apparatus 410 may provide the subdivided storage areas as LUs. Otherwise, the storage control apparatus 410 may provide such a storage area which is bridged over a plurality of magnetic disk apparatus 420 as a single LU. It should be understood that since the technically known management method may be applied to a management of such storage areas, descriptions thereof are omitted.

In this embodiment, the storage apparatus in which the magnetic disk is applied to the storage medium is employed. Alternatively, for instance, another storage apparatus in which another storage medium such as an optical disk is used may be employed. Furthermore, the storage control apparatus 410 may be equipped with a cache capable of temporarily saving a copy of data which is stored into the magnetic disk apparatus 420, although this cache is not shown in the drawings.

Figure 5:
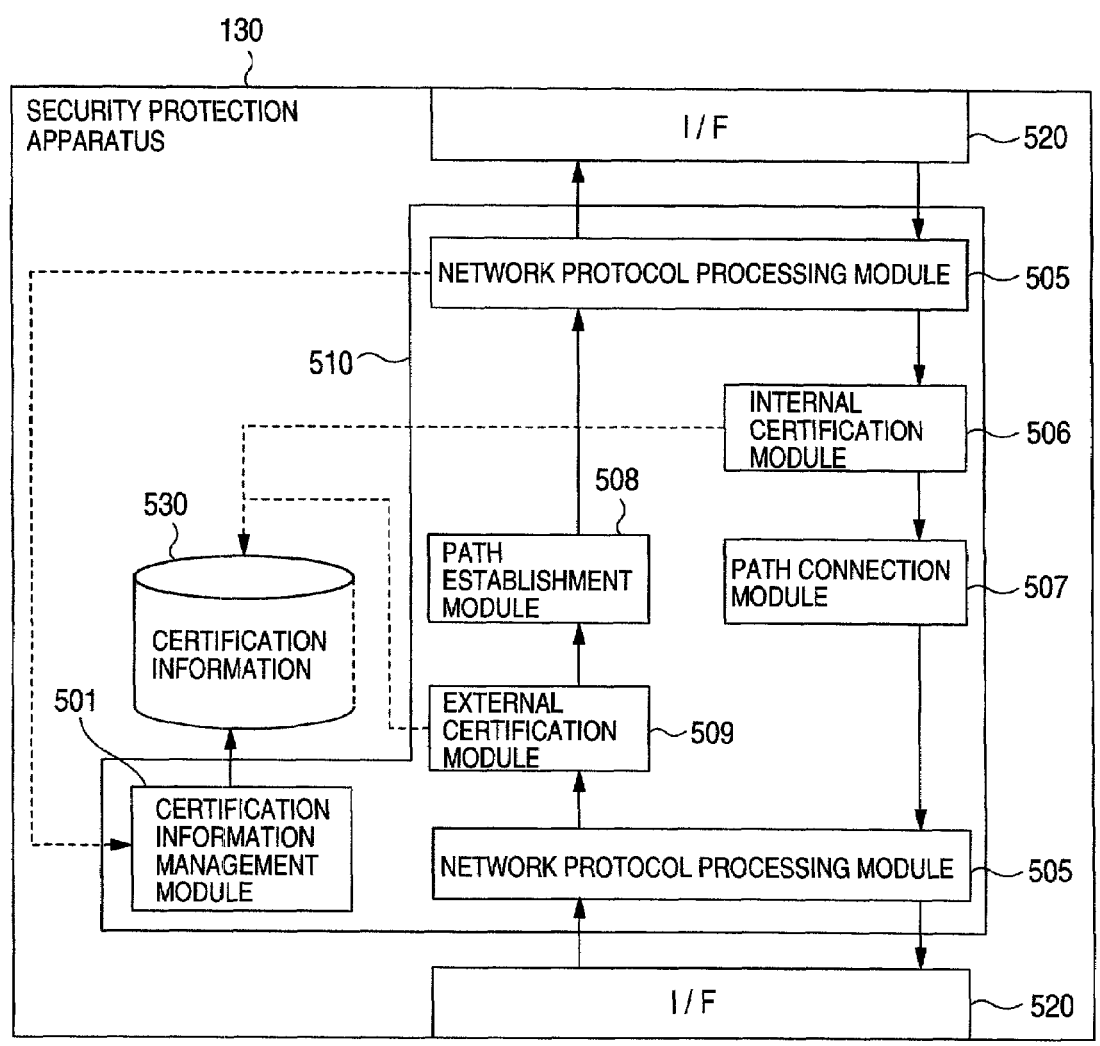
FIG. 5 is a functional block diagram for representing an arrangement of a security protection apparatus.

FIG. 5 is a functional block diagram for representing an arrangement of a security protection apparatus. In this drawing, the security protection apparatus 130 will be explained as an example. Also, the security protection apparatus 230 may be arranged in a similar manner.

The security protection apparatus 130 contains a processor 510, a network interface 520, an internal certification module 506 (will be discussed later), and a storage apparatus for storing thereinto a certification information database (certification information DB) 530. The network interface 520 is used to connect this security protection apparatus 130 to a network (namely, communication path between wide area network 30 and NAS server 120). The certification information database 530 stores thereinto certification information which is used in a certification process operation executed in an external certification module 508.

The processor 510 contains a network protocol processing module 505, the internal certification module 506, a path connection module 507, the external certification module 509, a path establishment module 508, and a certification information management module 501. The network protocol processing module 505 executes a message process operation in accordance with the TCP/IP protocol. The internal certification module 506 executes a certification process operation when the processor 510 is connected from an internal network via the wide area network 30 to an external network. The path connection module 507 requests setup of an encrypted communication path to the external network after the certification process operation has been carried out by the internal certification module 506. The external certification module 509 performs a certification process operation with respect to a connection established from the external network to the internal network. The path establishment module 508 establishes an encrypted communication with respect to such a communication, which is certified by the external process certification module 509. Also, the certification information management module 501 registers and manages the certification information via a network. It should also be noted that the functions of these structural modules may be realized by executing a program process operation on the processor 510.

The following information has been stored as the certification information into the certification information DB 530, namely, an encrypt key used to execute an encryption with a security protection apparatus as a connection counter party, a lifetime of the encrypt key, a certification algorithm, and either an IP address of the security protection apparatus as the connection counter party or information of a host name as a security protection have been previously stored.

The security protection apparatus 130 contains a memory and a cache memory in addition to the above-explained structural modules. The memory is used to store a program which is executed by the processor 510 (not shown). The cache memory is employed to cache a message to be communicated.

Figure 6:
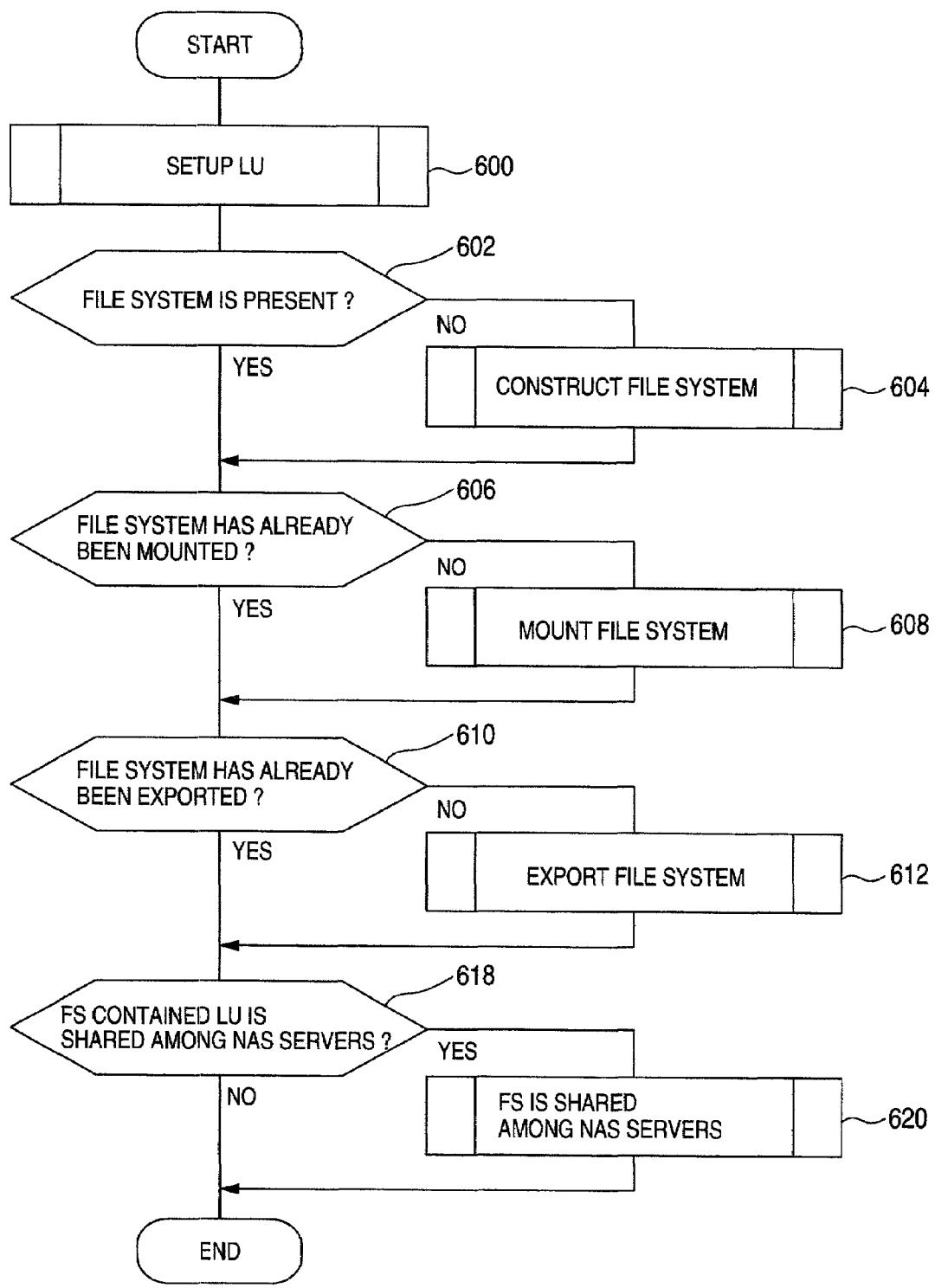
FIG. 6 is a flow chart for describing setup process operations of the NAS server.

FIG. 6 is a flow chart for describing a setup process operation executed by the NAS server 120. This setup process operation is properly carried out prior to a utilization of the NAS server 120 from the PC 110, or if necessary.

In the setup operation of the NAS server 120, a setup operation of an LU (logical unit) is firstly carried out (step 600).

Subsequently, a judgment is made as to whether or not a usable file system is present. That is, the NAS server 120 judges as to whether or not there is such a usable file system held in the LU by referring to a magic number of a super block which is described in a 1 block contained in this LU. When the usable file system is not present, a file system is constituted in a step 604 (step 602).

To the contrary, if the usable file system is present (otherwise, after the file system has been constructed), then the NAS server 120 judges as to whether or not this file system is mounted on the own NAS server 120. This judgment is carried out by referring to the file-mounted list which is recorded by the FS management module 223. In the case that the file system is not mounted, a mount process operation of the file system is carried out in a step 608 (step 606).

Furthermore, the NAS server 120 judges as to whether or not the mounted file system has been exported. This judgment is carried out by checking as to whether or not there is such information held in the export management table of the network FS processing module 222. When the mounted file system is not exported, the export of the file system is carried out in a step 612 (step 610).

Figure 7:
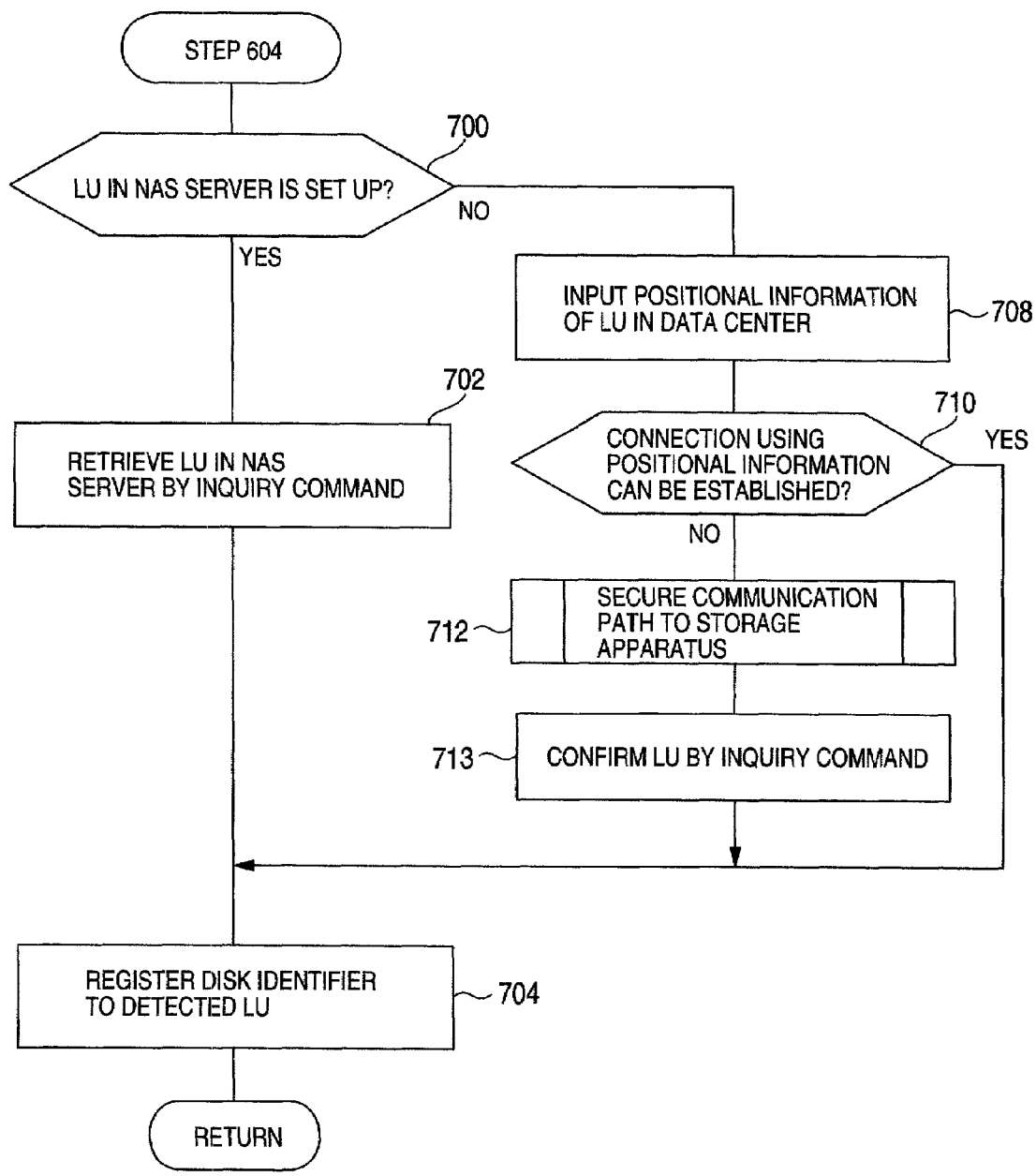
FIG. 7 is a flow chart for explaining LU setup process operations.

FIG. 7 is a flow chart for explaining a flow operation of the LU setup process operation executed in the step 600. The LUs existing in a local site 10 and a remote site 20 may be recognized by the NAS server 120 since this setup process operation is carried out.

The NAS server 120 accepts such a selection made by a manager that an existence place of an LU to be allocated is equal to the LU contained in the NAS server 120, or the LU contained in the data center 200 (step 700).

In the case that the LU contained in the NAS server 120 is selected by the manager, the NAS server 120 issues the Inquiry command of the SCSI to all LUs of the storage apparatus 215 so as to detect an LU, and displays such information capable of identifying this LU on a display apparatus (not shown) (step 702).

Subsequently, the NAS server 120 causes the block device protocol processing module 224 to register such a disk identifier which is exclusively determined by the computer system 10 and the data center 20, and then, accomplishes the setup process operation of the LU (step 704).

In the case that the LU which is selected in the step 700 is present within the data center 20, the NAS server 120 may accept positional information of the LU located at the remote site from the manager. As the positional information of the LU, either the IP address or the host name of the storage subsystem 250, and an iSCSI name which is employed in the iSCSI and exclusively determines the LU are utilized. In this case, both the disk identifier and the iSCSI name basically indicate the LU, while the disk identifier contains information of the I/F 212 which constitutes the connection path to the device. As a result, even when a plurality of I/Fs are present, the disk identifier may exclusively determine the relevant LU (step 708).

Subsequently, while the inputted positional information is employed, the connection of the storage subsystem 250 to the LU is tried to be carried out, and a check is made as to whether or not this connection to the LU can succeed (step 710). When the connection of the storage subsystem 250 to the LU can succeed, the setup operation is advanced to the process operation defined in the step 704. On the other hand, when the connection fails, a communication path of the storage subsystem 250 to the LU is established in a step 712. Thereafter, the setup operation to the process operation defined at the step 704 (step 712).

Figure 8:
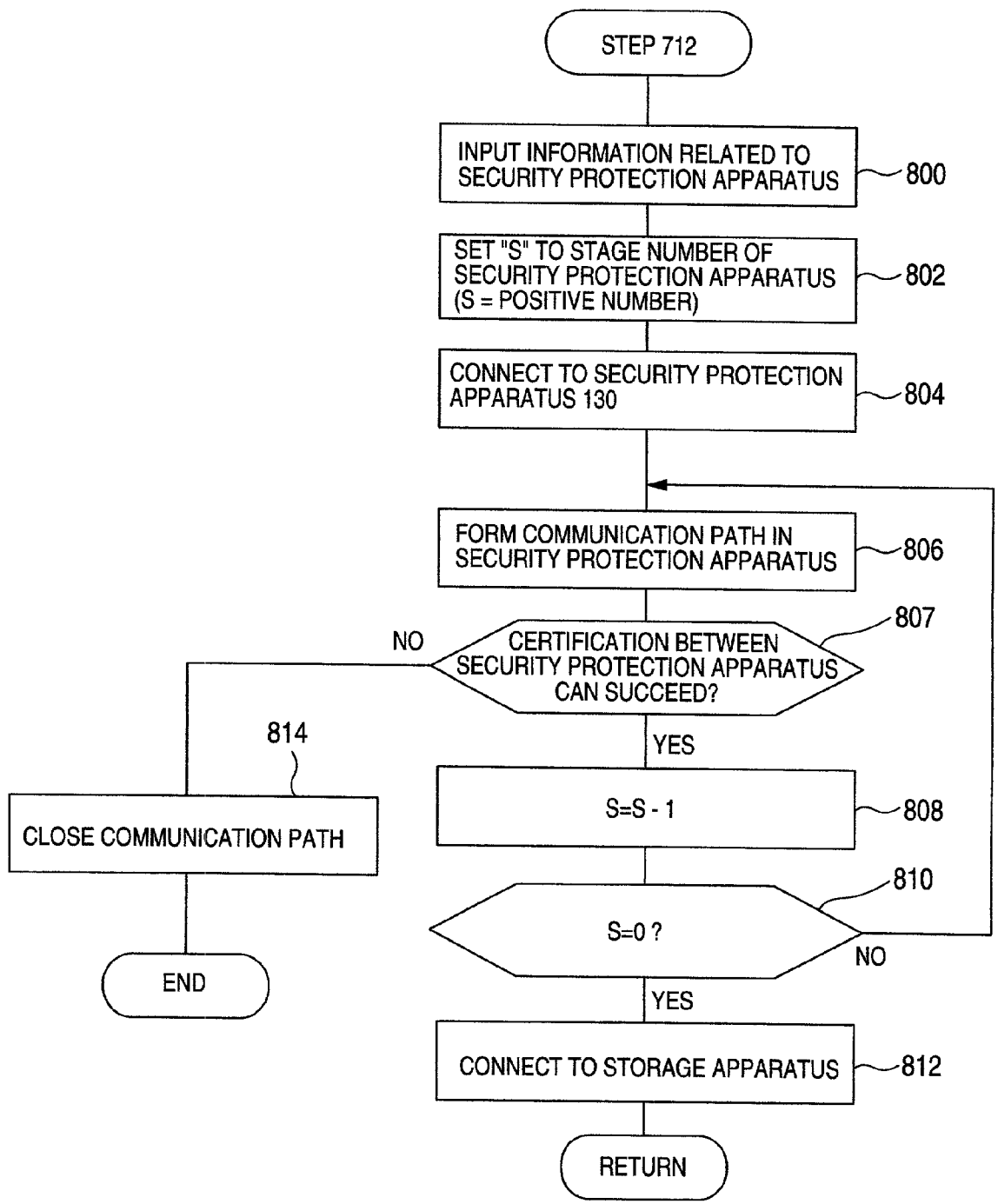
FIG. 8 is a flow chart for describing process operations of establishing a communication path to an external storage apparatus.

FIG. 8 is a flow chart for describing the establishing process operation of the communication path to the externally provided storage subsystem 250, which is executed in the step 712. Since this process operation is carried out, the communication path to the storage subsystem 250 may be secured.

First, the NAS server 120 accepts an input of certification information related to the security protection apparatus 230 of the data center 20 from the manager. The NAS server 120 forms the previously-explained security protection apparatus management table based upon the inputted information (step 800).

Subsequently, the NAS sever 120 acquires a total number of security protection apparatus based upon such information which has been registered in an entry of the relevant path of the connection path management table, and then, sets a stage number of the security protection apparatus to a variable "S" (step 802).

The NAS server 120 is connected to the security protection apparatus 130. At this time, the NAS server 120 may certify the security protection apparatus 130 and then may be connected to the security apparatus 130 in order to improve safety characteristics of this security protection apparatus 130 (step 804).

The NAS server 120 is connected via the wide area network to any one of the plural security protection apparatus 230 by employing the TCP/IP protocol, while these plural security protection apparatus 230 are present in a path reached to the data center 20 (step 806). Thereafter, the certification information registered in the security protection apparatus management table is transferred to the security protection apparatus 130 as such certification information which is required to connect this security protection apparatus 130 to the security protection apparatus 230 provided on the side of the data center 20. The NAS server 120 judges as to whether or not the certification can be done based upon this certification information (step 807).

When the certification can succeed in the step 807, the NAS server 120 subtracts "1" from the value of the above-described variable "S" (step 808). Then, the NAS server 120 judges as to whether or not this variable "S" becomes 0. In other words, the NAS server 120 checks as to whether or not the certification operations are completed as to all of the security protection apparatus (step 810). When the certification operations as to all of the security protection apparatus are accomplished, the NAS server 120 establishes a communication path between the security protection apparatus 130 and 230, and executes a connection to the storage subsystem 250 in which a target LU is contained (step 812).

In the step 810, in the case that the variable "S" >0, namely, there is such a security protection apparatus whose certification has not yet been completed, the communication-path-establishing process operation is returned to the previous step 806. In this step 806, the NAS server 120 executes the certification operation as to the next security protection apparatus.

In the step 807, in such a case that the certification operation of the security protection apparatus fails, the NAS server 120 cuts off logical communication paths established among all of the security protection apparatus whose certification operations have been accomplished, and then, accomplishes the setup process operation (step 814).

Figure 9:
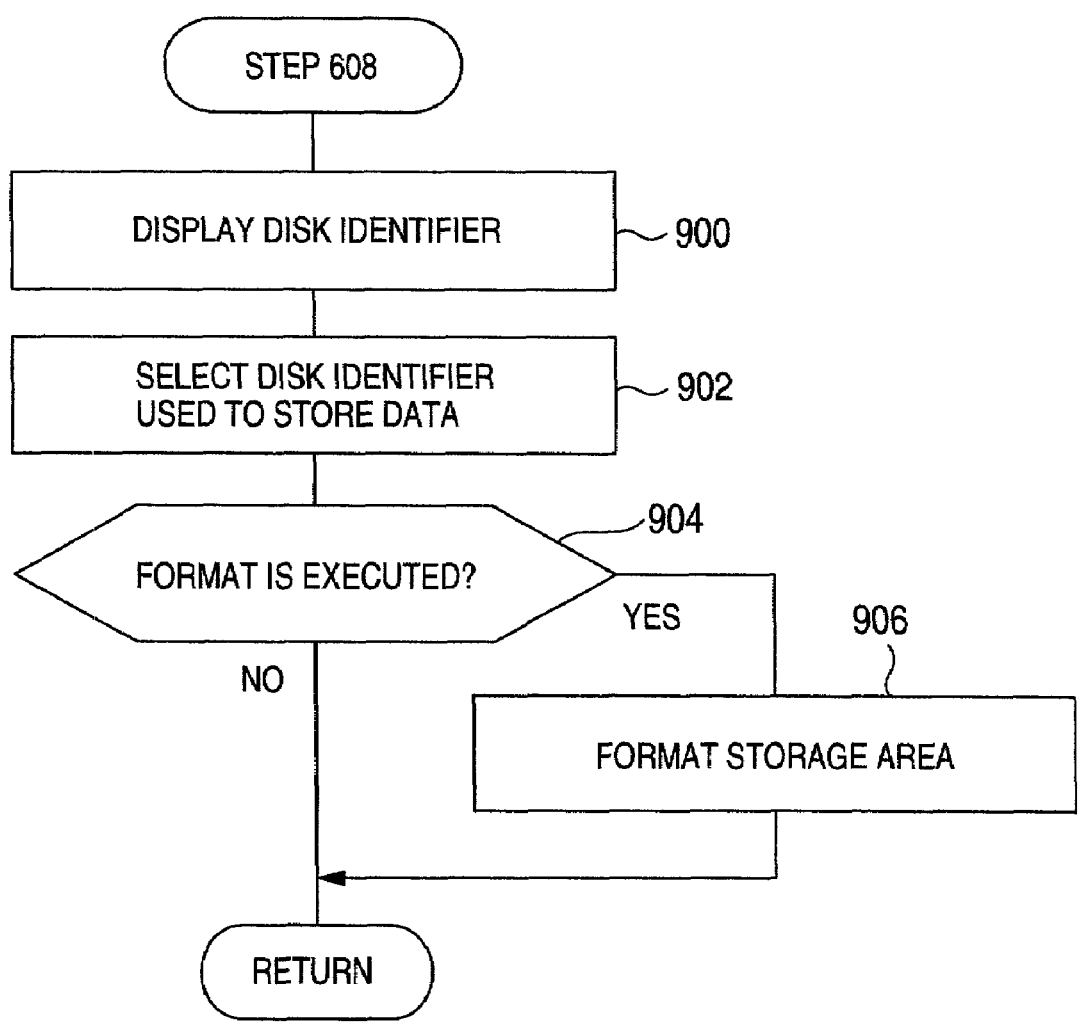
FIG. 9 is a flow chart for explaining constructing process operations of a file system.

FIG. 9 is a flow chart for explaining a flow operation of the construction process operations of the file system executed in the step 608. In the case that either a file system is not present in the storage area on the recognized LU or a file system is newly formed, such a file system is constructed by executing this construction process operation.

In the construction process operation of the file system, the NAS server 120 selects the disk identifier which indicates the LU detected in the LU setup process operation (see step 604) by the FS management module 223. At this time, existence of a file system on each of the storage areas is checked by confirming the above-described super block. When the file system is present, a title of the file system is displayed in correspondence with the LU where this file system is constructed (step 900).

Subsequently, the NAS server 120 accepts from the manager, the selection of the disk identifier corresponding to the LU where the file system is constructed on the screen where the above-described disk identifier is displayed in the step 900 (step 902).

Next, the NAS server 120 inquiries as to whether or not a format with respect to the selected LU is carried out (step 904). When the format is not instructed by the manager, the construction process operation of the file system is accomplished. To the contrary, when the format is instructed by the manager, the format of the selected storage area is carried out. Since this format is performed, a super block, i-node, and a block, which correspond to elements for constituting the above-explained file system, are formed on the selected LU (step 906).

Figure 10:
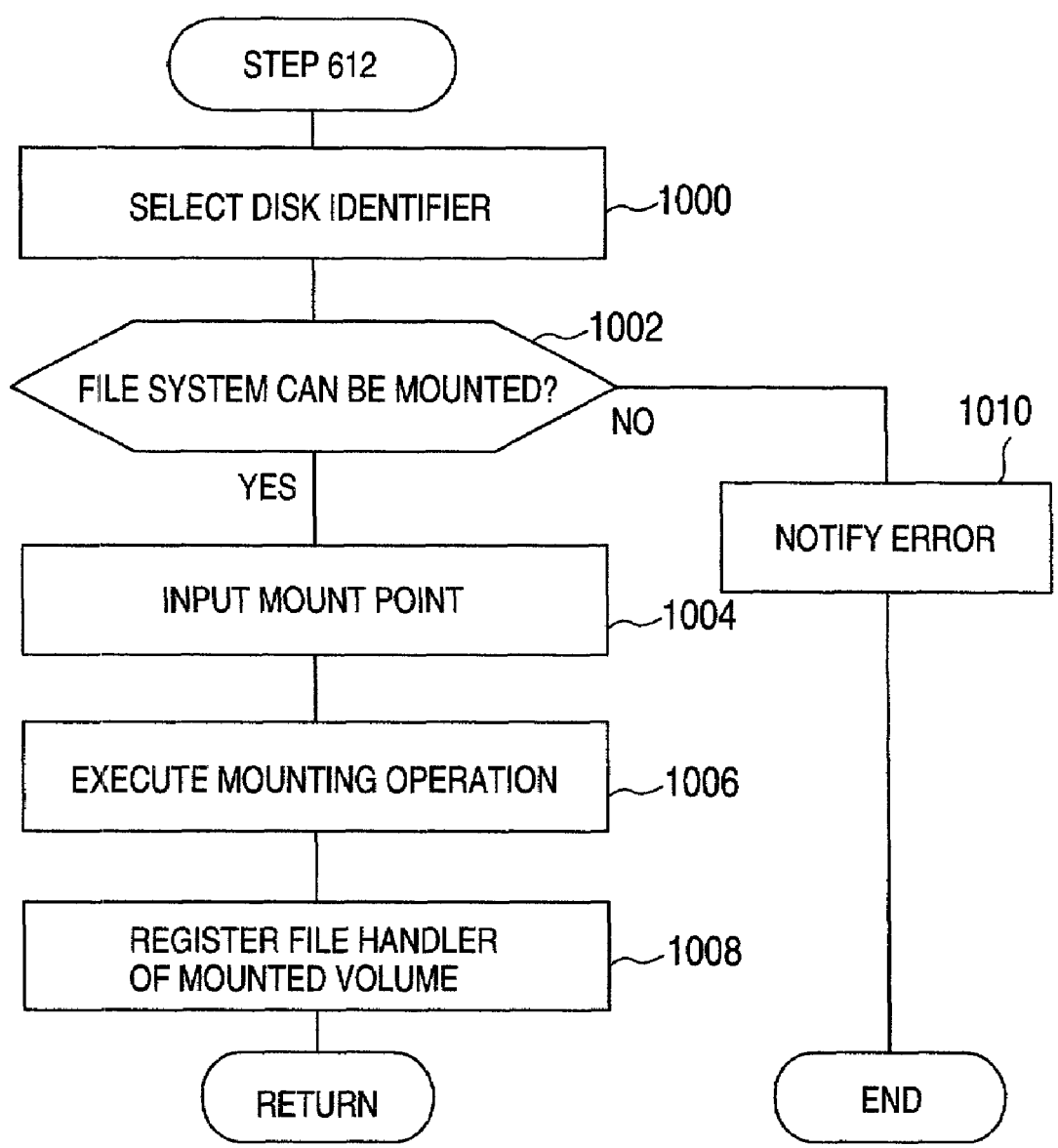
FIG. 10 is a flow chart for describing mounting process operations of the file system.

FIG. 10 is a flow chart for describing a detailed content of the mounting process operation of the file system executed in the step 612.

In the mounting process operation, an identifier of an LU contained in the disk apparatus 250 to be mounted is firstly registered by the manager. At this time, for instance, a disk identifier of an LU which can be recognized by the NAS server 120, a title (when such a title is made) of a file system constructed in this LU, and also a mount point name of the LU (when LU has been mounted) are displayed on the disk apparatus in correspondence with each other. The manager selects a disk identifier of such an LU to be mounted from the displayed disk identifiers (step 1000).

Subsequently, the NAS server 120 judges as to whether or not a file system present within the selected LU can be mounted by checking the file-mounted list of the file system which is managed within the memory by the FS management module 223 (step 1002).

In such a case that the file system of the selected LU can be mounted, the NAS server 120 accepts a designation of a mount point from the manager (step 1004). When the mount point is designated, the file system contained in the LU which is selected in the step 1000 is mounted at the designated mount point in the NAS server 120 (step 1006). When the file system of the LU is mounted, the NAS server 120 reads out first i-node information (namely, root directory which constitutes base of file system) from the information stored in the super block of the file system in order to form an initial condition under which the file system can be utilized. Then, the NAS server 120 registers the read first i-node information into the memory, so that the mounting process operation is accomplished (step 1008).

On the other hand, when it is so judged that the file system cannot be mounted in the step 1002, an error is notified to the manager, so that the setup process operation by the NAS server 120 is completed (step 1010).

The above-described operation describes the process operations executed when the file system is mounted. In the case that the NAS server 120 accomplishes the management of the mounted file system, this NAS server 120 dismounts this file system. While the file system is dismounted, or uninstalled, the i-node information, the block information, and also, the updated super block of such a file system which is managed on the memory of the FS management module are firstly rewritten from the memory into the LU. Then, the entry of this relevant file system is deleted from the file-mounted list contained in the FS management module 223.

Next, a description will now be made of a file access process operation executed in this embodiment.

When each of the PCs 110 tries to access a file, this PC 110 mounts an LU (logical unit) opened by the NAS server 120 via the LAN 140. While using the file operation provided by the NOS 112, the PC 110 accesses a file contained in a mounted volume. As a typical file operation, there are file open, read, write, close operations.

In such a case that a specific file is accessed, such an identifier is employed. This identifier is called as a "file handler", and is exclusively determined with respect to each of files. This file handler is acquired when a file is opened.

Figure 12:
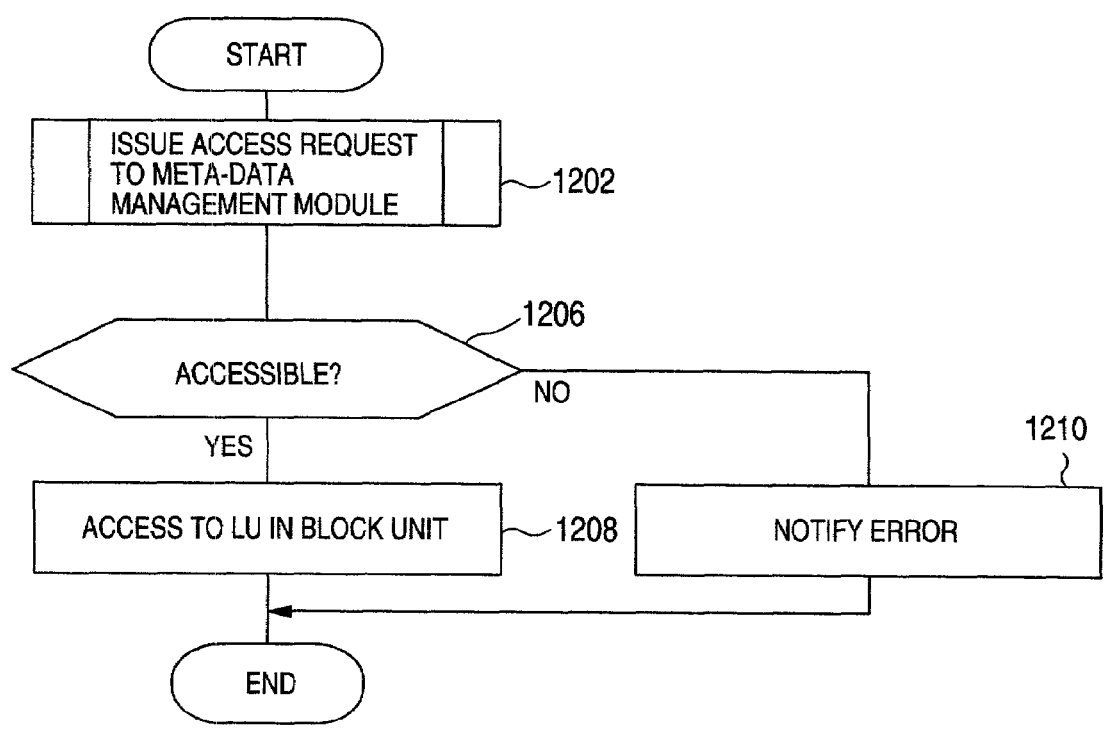
FIG. 12 is a flow chart for indicating an outline of file accessing process operations executed in an NAS server.

FIG. 12 is a flow chart for schematically describing a file access process operation executed in the NAS server 120. This file access process operation is carried out in response to such a request as a file open, a file close, a file read, and a file write, which are issued by employing a file operation from the PC 110.

When an access request of a file is issued from the PC 110, the network FS management module 222 requests the meta-data management module 223 to permit an access related to a required sort of file operation, while utilizing the file operation of the network FS management module 223 (step 1202).

When a response related to an access control to a file is issued from the meta-data management module 2231, the network FS management module 222 judges as to whether or not an access operation is allowed based upon this response (step 1206).

In the case that the access operation is permitted, the network FS management module 223 instructs the block device protocol processing module 224 to execute both a read process operation and a write process operation with respect to an LU in the unit of a block by employing the block device protocol of the SCSI. In the case that the subject LU is present in the storage apparatus 215, the storage area management module 225 executes the access process operation with respect to the LU stored in the storage apparatus 215. Also, when the subject LU is present in the data center 20, the storage area management module 225 accesses the relevant LU of the storage subsystem 250 of the data center 20 (step 1208).

To the contrary, in the case that the access operation is not allowed, the network FS processing module 222 notifies an error and accomplishes this access process operation (step 1210).

Figure 13:
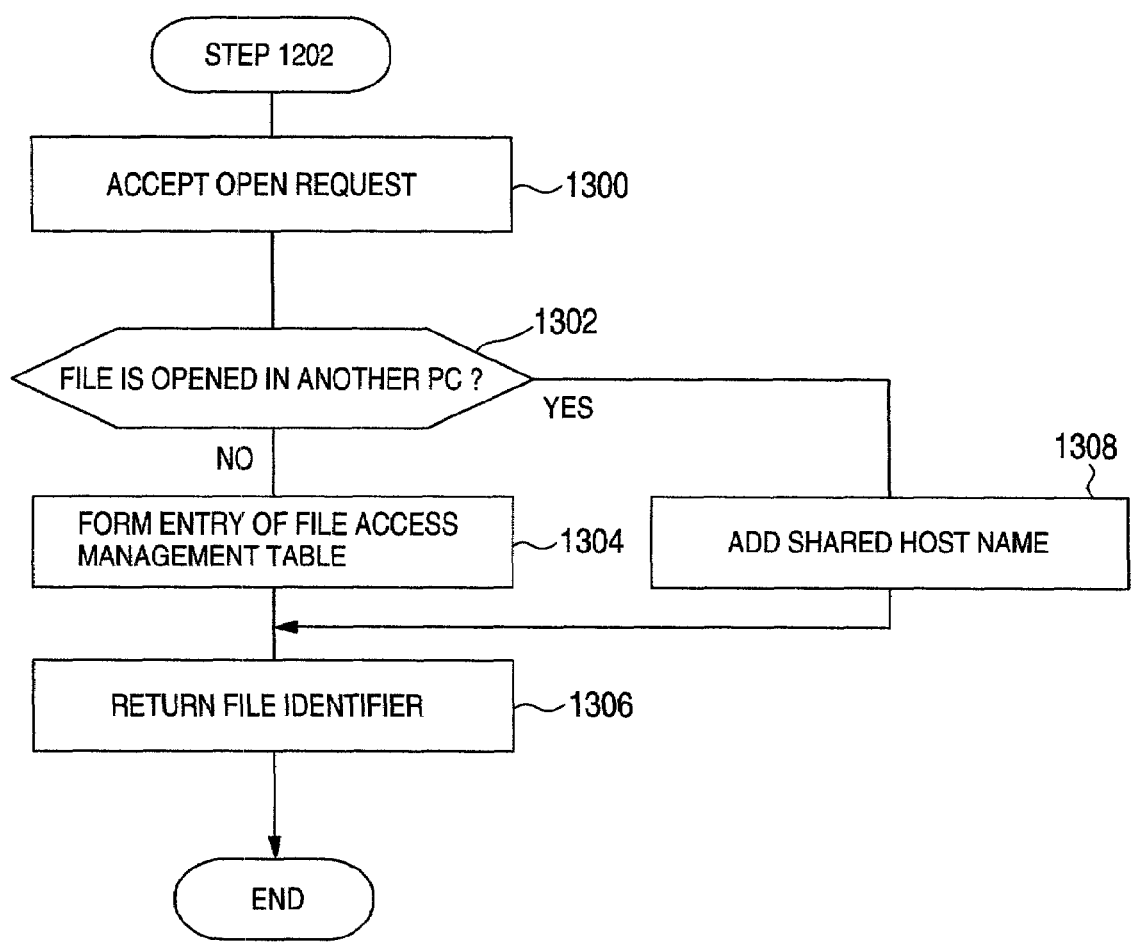
FIG. 13 is a flow chart for explaining a detailed process operation of a step 1202 defined in opening process operations of a file.

FIG. 13 is a flow chart for explaining detailed process operations of the step 1202 during the file open process operation.

When the NAS server 120 accepts an open request with respect to a specific file from the PC 110, this open request is entered into the network FS processing module 222. The network FS processing module 222 requests the FS management module 223 to open such a file designated by the open request issued from the PC 110. The FS management module 223 transfers this open request to the meta-data management module 2231 (step 1300).

The meta-data management module 2231 judges as to whether or not the designated file has already been opened with reference to the file access management table. Concretely speaking, the meta-data management module 2231 checks as to whether or not either a host name or such information as to an IP address and a file identifier has been set to an active item related to the relevant file of the file access management table (step 1302). The host name, the IP address, and the file identifier indicate that any one of the PCs refers thereto.

When the designated file is not opened, the meta-data management module 2231 forms an entry of this file in the file access management table so as to setup both i-node information and a disk identifier. Also, the host name of the PC 110 which issues the open request is set to the active item (step 1304).

Next, the meta-data management module 2231 returns a unique identifier to the network FS processing module 222 functioning as the request source, while this unique identifier is employed in a file access operation (step 1306).

On the other hand, when the meta-data management module 2231 judges that the file has already been opened in the step 1302, the meta-data management module 2231 adds both the host name of the PC 110 and the identifier of the file to a record of this relevant file contained in the file access management table (step 1308). Then, the meta-data management module 2231 returns the file identifier and can perform the access operation with employment of this file identifier in the step 1306.

Figure 14:
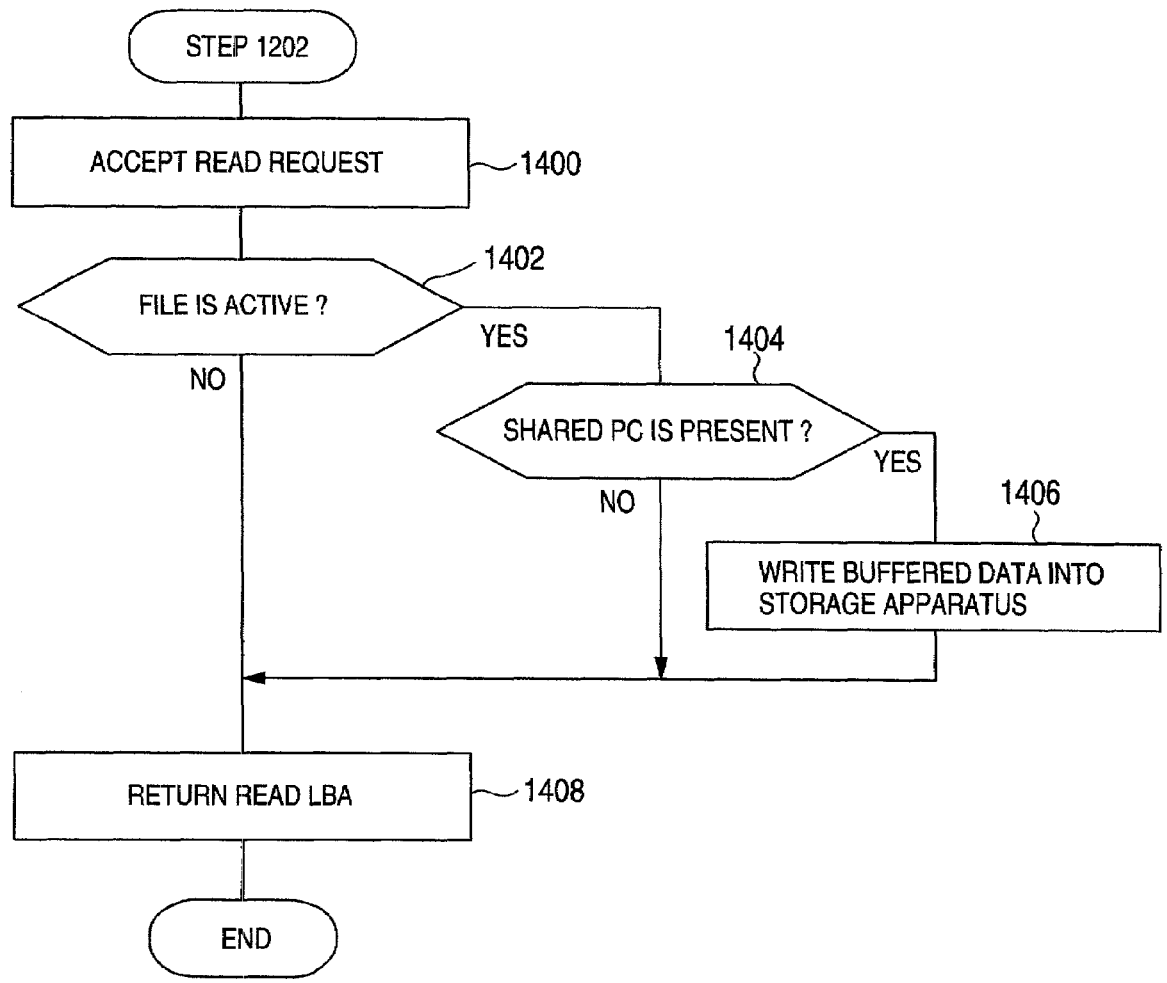
FIG. 14 is a flow chart for explaining a detailed process operation of the step 1202 defined in reading process operations of a file.

FIG. 14 is a flow chart for describing detailed process operations of the step 1202 in a file read process operation.

When the NAS server 120 accepts a read request of specific file data from the PC 110, this read request is entered into the network FS processing module 222. The network FS processing unit 222 sends this read request to the FS management module 223 (step 1400).

The FS management module 223 transfers this read request to the meta-data management module 2231. Similar to the previous step 1302, the meta-data management module 2231 checks as to whether or not a file to be read is opened and the present state is brought into an active state (step 1402).

In the case that the file is opened, the meta-data management module 2231 further checks as to whether or not other PCs 110 which commonly share a file are present by referring to the file access management table (step 1404). In the case that there are other PCs 110 which commonly share the file, the meta-data management module 2231 instructs these PCs 110 to rewrite the buffered data into the storage subsystem 250, and thus can guarantee consistency of the file data (step 1406).

When the file is not opened in the step 1402, when the file is not commonly shared by other NAS servers in the step 1404, or after the data has been rewritten into the storage subsystem by executing the process operation of the step 1406, the FS management module 223 acquires block positional information indicative of a range of data which should be read out from the i-node information of the file access management table, and then, returns the acquired block positional information to the network FS processing module 222 (step 1408).

After the above-described process operations have been carried out, the NAS server 120 reads out data from the storage subsystem based upon the received block positional information by executing the process operation defined in the previous step 1208. The NAS server 120 returns both the read data and a data size thereof from the storage area management module 225 to the network FS processing module 222. Then, the PC 110 acquires such a memory area containing the size and the data as a return value of the requested read process operation.

Figure 15:
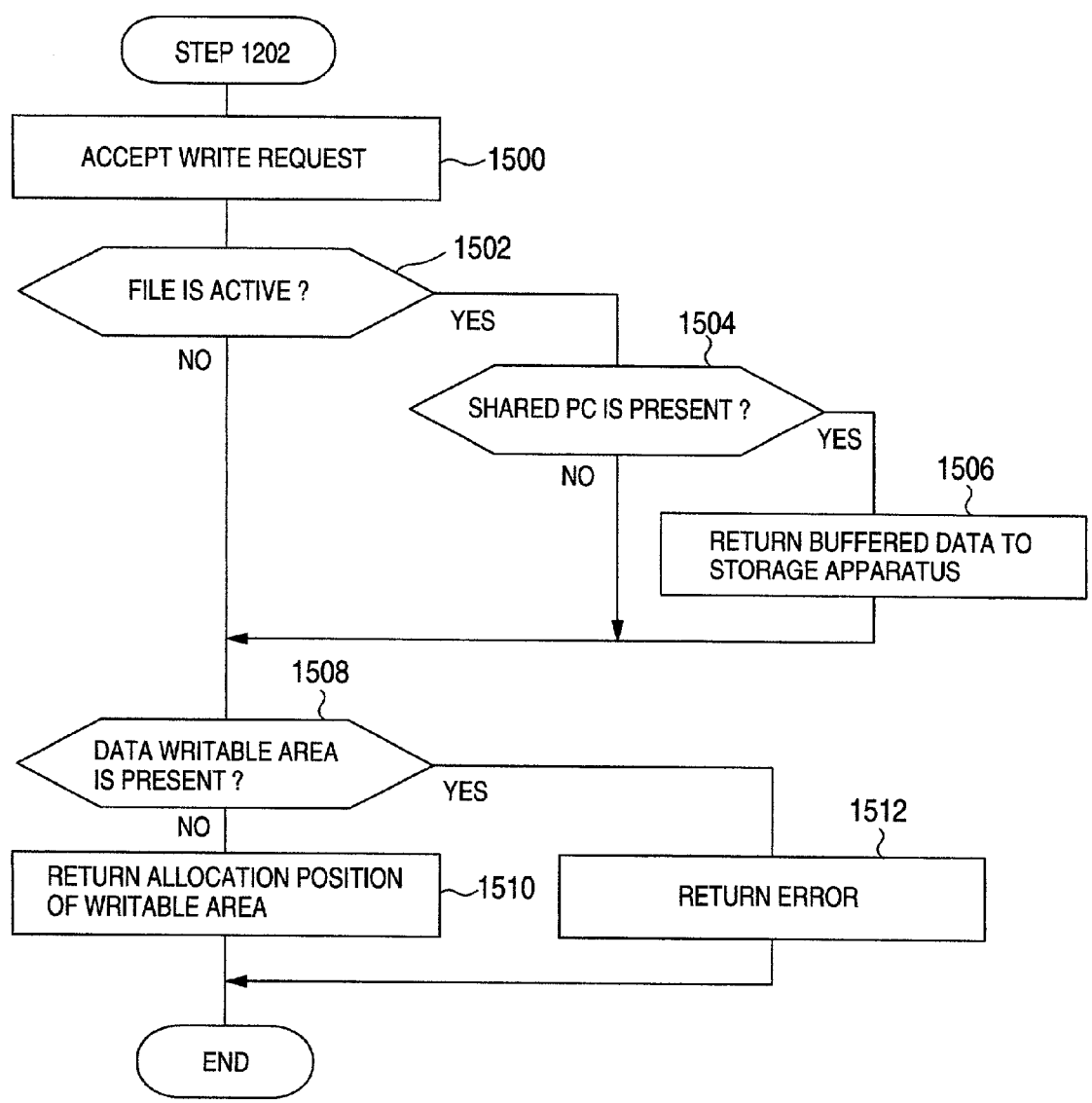
FIG. 15 is a flow chart for describing a detailed process operation of the step 1202 defined in writing process operations of a file.

FIG. 15 is a flow chart for explaining a detailed process operation of the step 1202 in a write process operation of a file.

When the NAS server 120 accepts a write request of a file from the PC 110, this write request is entered into the network FS processing module 222.

The network FS processing unit 222 sends this write request to the FS management module 223 (step 1500).

Similar to the previous steps 1402 to 1406, the meta-data management module 2231 checks as to whether or not a file has already become active (step 1502), and also checks as to whether or not there are such PCs 110 which share the file (step 1504). When there are such PCs 110 which share the file, an instruction is issued so as to write the buffered data (step 1506).

After the above-described process operations have been executed, the meta-data management module 2331 checks as to whether or not an area (block) used to write thereinto data can be secured in the storage apparatus 215 and the storage subsystem 250. When such an area (block) can be secured, this area is allocated in order to write data thereinto. The block allocation in this case is carried out in a similar manner to the block allocation which has been conventionally carried out by a general-purpose file system (step 1508).

When the area allocation operation is ended, a block address thereof is returned from the meta-data management module 2331 to the FS management module 223 as positional information of the allocated area (step 1510).

Thereafter, the NAS server 120 writes data into either the storage subsystem 250 or the storage apparatus 215 based upon the block address returned to the FS management module 223. When the writing operation of the data is accomplished, a size of this written data is returned from the FS management module 223 to the network FS processing module 222, and the data size which has been written as the return value from the network FS processing module 222 is sent to the PC 110 of the request source.

In such a case that the area cannot be secured in the step 1508, an error is returned as write access being not allowable, and then, this fact is notified to the PC 110 of the request source (step 1512).

Figure 16:
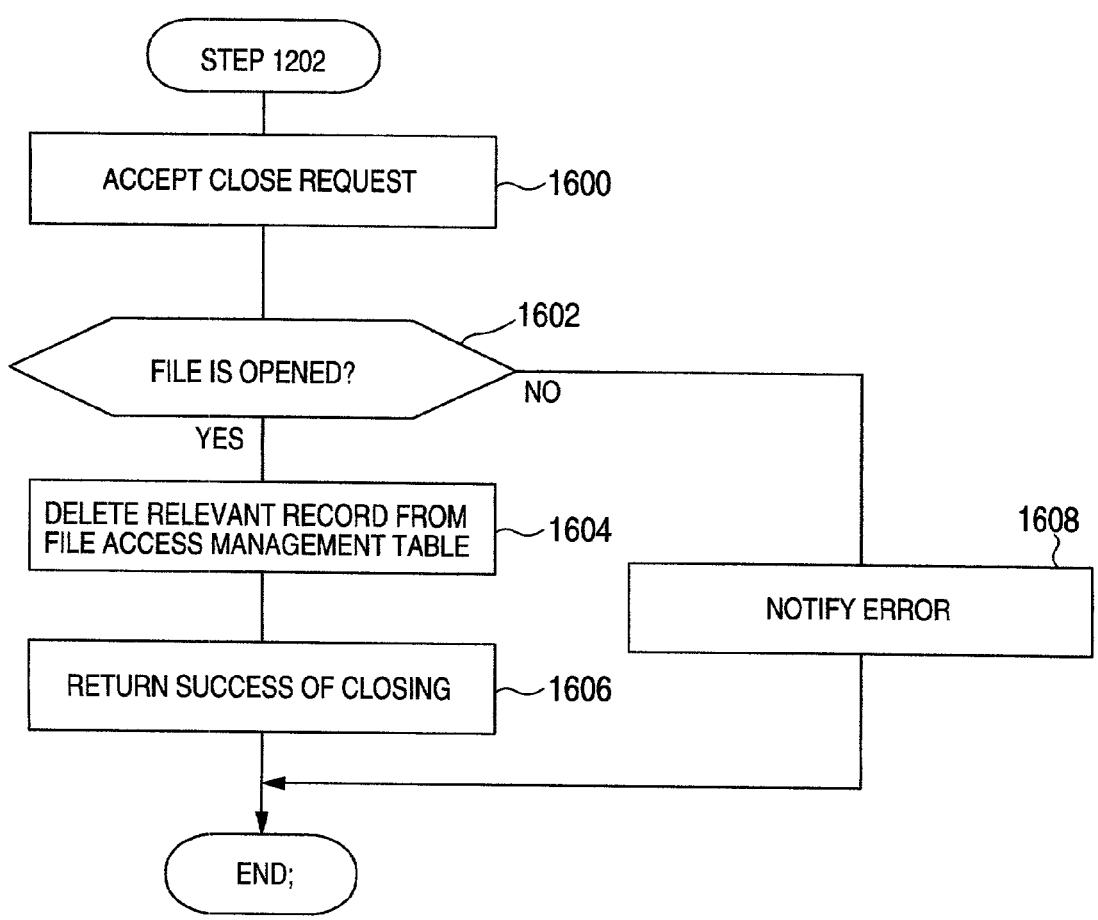
FIG. 16 is a flow chart for describing detailed process operations of the step 1202 defined in closing process operations of a file.

FIG. 16 is a flow chart for describing detailed process operations of the step 1202 in a file close process operation.

When the network FS processing module 222 accepts a close request from the PC 110 in a similar manner to the open process operation (step 1600), this network FS processing module 22 checks as to whether or not a file to be processed is opened (step 1602).

When the file is opened, information as to the relevant file is deleted from the file access management table (step 1604). After an entry of this relevant file is deleted from the file access management table, the meta-data management module notifies such a fact that closing of the file can succeed, and accomplishes this close process operation (step 1606).

On the other hand, when it is so judged that the relevant file is not opened in the step 1602, the meta-data management module notifies an error, and then, accomplishes this close process operation (step 1608).

Figure 18:
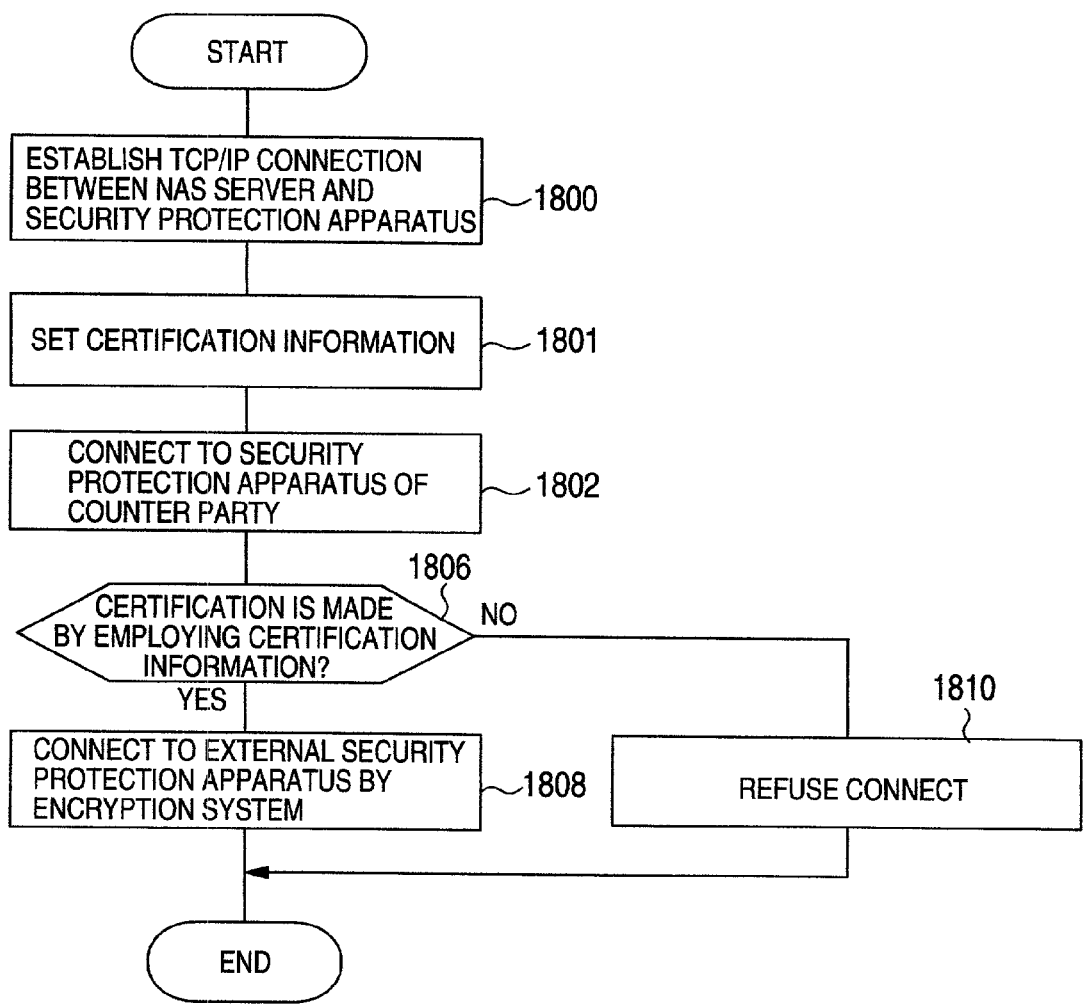
FIG. 18 is a flow chart for describing sequential operations of certification operations performed by a security protection apparatus.

FIG. 18 is a flow chart for describing sequential operations as to a certification operation executed between the security protection apparatus 130 and 230.

First, a connection is established from the NAS server 130 to the security protection apparatus 130 by way of the TCP/IP (step 1800) so as to setup the above-explained certification information (step 1801). In the connection by way of the TCP/IP at this time, the certification operation from the NAS server 120 may be carried out by the internal certification module 506 in order to maintain security from the internal side. A connection to an externally-provided security protection apparatus is established by using the TCP/IP protocol, while employing an IP address of this externally-provided security protection apparatus which is described in the certification information (step 1802).

Subsequently, the certification information is sent to the security protection apparatus 230 functioning as the connection counter party. The security protection apparatus of the connection counter party performs a certification operation by comparing the certification information sent from the external certification module 509 with the certification information held in the certification information DB 530 (step 1806).

When the certification operation can succeed, the path connection module 507 establishes a connection between the internal security protection apparatus and the external security protection apparatus by way of such a communication path which is encrypted based upon the encrypt algorithm contained in the certification information (step 1808).

When the certification operation fails in the step 1806, the connection between the connection source apparatus and the security protection apparatus is interrupted (step 1810).

While the above-described process operations are carried out, the logical communication paths can be established between the NAS server 120 and the security protection apparatus 130 provided in the own system, between the NAS server 120 and the security protection apparatus 230 of the data center 20, and also between the NAS server 120 and the storage subsystem 250. Also, there are some cases that the IP address management mode executed in the own system is different from the IP address management mode executed in another system. In such a case, a mechanism for converting an IP address of the own system into another IP address of another system, for example, a function of an NAT (Network Address Translator) may be installed into a security protection apparatus.

In accordance with the above-described first embodiment, the storage apparatus can be utilized which are provided from the PCs via the LAN by the NAS server. While the NAS server may be provided within the own server, or outside the own server, this NAS server can conceal the physical locations of the storage apparatus with respect to the PCs. While a user of such a PC uses a storage area provided by an NAS server, this user can utilize the storage apparatus without paying an attention to a storage position of data.

In the above-described first embodiment, in such a case that a storage apparatus provided at a data center is commonly shared by a plurality of NAS servers which are provided in different computer systems 10, there is such a risk that consistency of data stored in this storage apparatus cannot be maintained. An example of such a computer system capable of considering commonly-shared storage apparatus in which consistency of data from a plurality of NAS servers can be maintained will now be described in the below-mentioned explanations.

Figure 19:
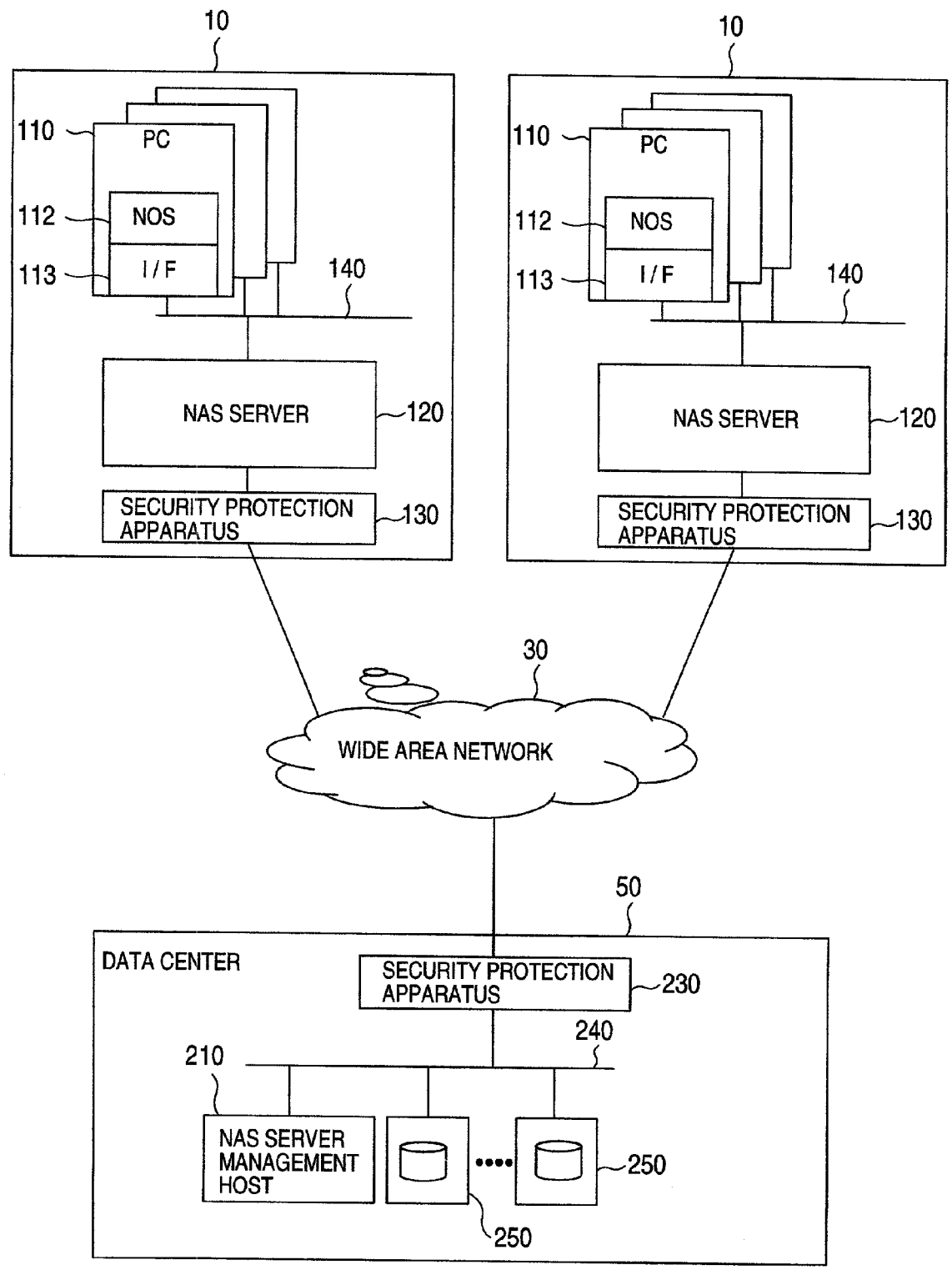
FIG. 19 is a block diagram for simply indicating an arrangement of a computer system according to a second embodiment, to which the process invention is applied.

FIG. 19 is a schematic block diagram for indicating a computer system according to a second embodiment of the present invention.

The computer system according to this second embodiment is arranged by that a plurality of computer systems 10 are connected via a wide area network 30 to a data center 50. The computer system of this second embodiment owns a substantially similar arrangement to that of the first embodiment except that a partial operation of the process operations executed in an NAS server 120 of each of these computer systems 10 is changed, and an NAS server management host 210 is newly provided in the data center 50.

The NAS server management host 210 executes an exclusive management, an access management, and the like in such a case that a file is commonly owned between the NAS servers 120. It should be noted that the following description is made as to such a case that only one set of NAS server management host 210 is provided in this second embodiment. Alternatively, while plural sets of such NAS server management hosts 210 are employed, a file system of a storage area provided by a storage subsystem 250 may be distributed to these plural NAS server management hosts 210 so as to be managed.

Figure 3:
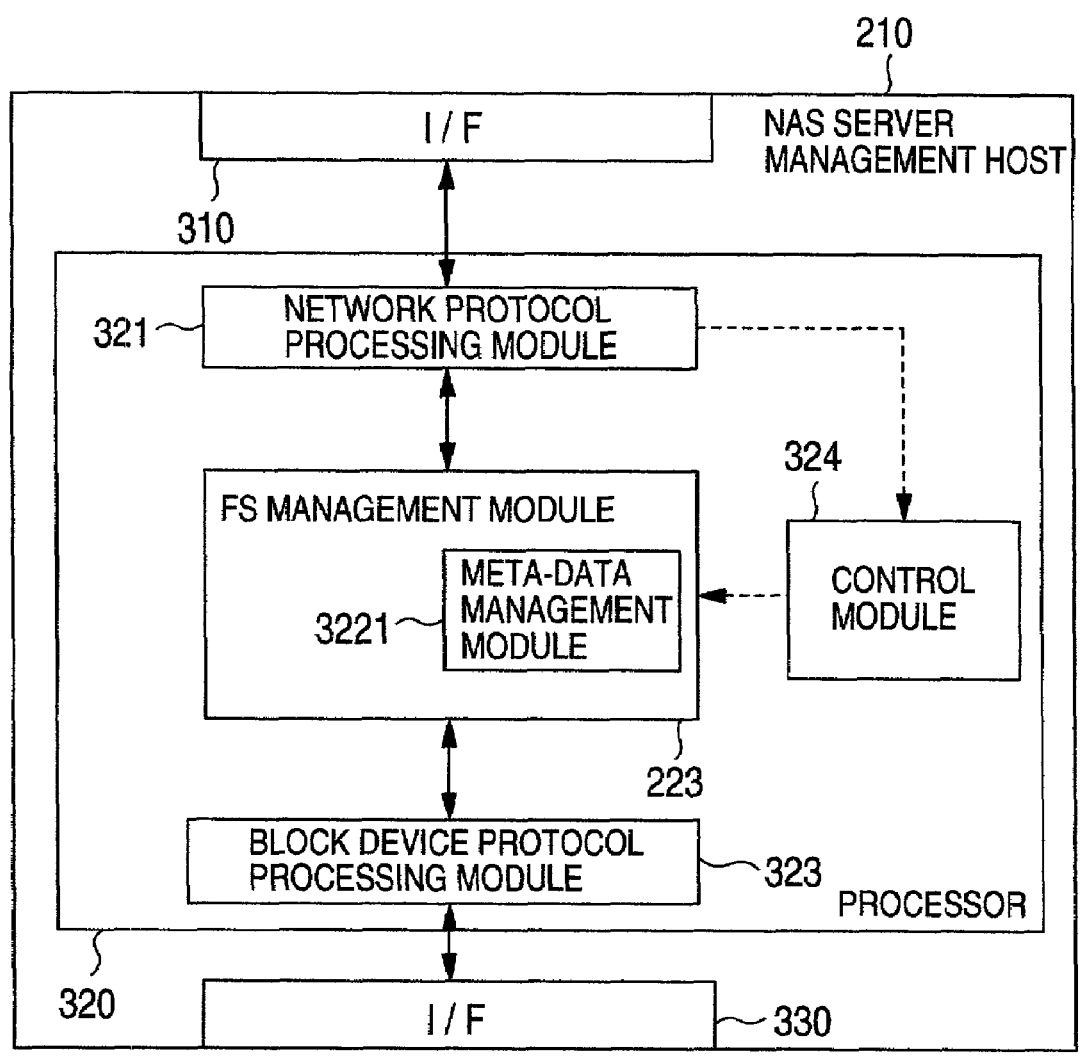
FIG. 3 is a functional block diagram for representing an arrangement of an NSA server management host.

FIG. 3 is a functional block diagram for representing an internal arrangement of the NAS server management host 210. The NAS server management host 210 executes an access control operation when files are shared in order to guarantee data with respect to the files which are recorded on storage subsystems 250 within the data center 20, and are used in common among these plural NAS servers 120. In this second embodiment, the access control operation is carried out by the NAS server management host 210. Alternatively, the NAS server management host 210 may be provided with another control related to files such as exclusive managements in addition to this function.

The NAS server management host 210 contains network interfaces 310, 330, and a processor 320. Although the NAS server management host 210 owns a memory, an input/output device, and the like in addition to these structural elements, these memory and input/output device are not directly related to the explanations of the present invention, and therefore, are not shown in the drawing.

The processor 320 controls an access operation to a file, which is issued from the NAS server 120 and is received via the network interface 310. As a result, the processor 320 owns a network protocol processing module 321, a file system management module (FS management module) 322, a block device protocol processing module 323, and a control module 324. The functions of the respective modules owned by the processor 320 may be realized by executing a program processing operation on the processor 320.

Similar to the above-described network protocol processing module 221, this network protocol processing module 321 executes a reception process operation of an access request issued from the NAS server 120, and a transmission process operation of file data to the NAS server 120 in accordance with the TCP/IP protocol. While the network protocol processing module 321 executes the reception process operation of the access request issued from the NAS server 120, this network protocol processing module 321 transfers the received request to the FS management module 322.

Similar to the FS management module 223 of the NAS server 120, the FS management module 322 owns a function of a mounting process operation, a function of a dismounting process operation when the process operation is ended, and a function capable of transferring the access request of the file requested by the FS management module 223 to a meta-data processing module. In this mounting process operation, file system information on an LU is read so as to establish an initial condition.

In the meta-data management module 3221, while employing the file access management table containing the i-node information related to the file under access operation, the access management of the file is carried out, and when the file is commonly shared by a plurality of NAS servers 120, the meta-data management module 3221 can guarantee consistency of the data with respect to the access request transferred from the FS management mode 223. In particular, in the case that the data of the file and the i-node information are buffered in the FS management module 223 of the NAS server 120, the meta-data management module 3201 performs the control operation in such a manner that after this data of the file is once flashed, the access to the file is carried out. Also, with respect to the information about the file system to be mounted, which is described in the file system management table in the first embodiment, either a host name or an IP address of such an NAS server 120 which is allowed to share the file is added. It should also be noted that one set, or plural sets of this host name, or the IP address may be employed.

In such a case that the file system contained in the LU within the storage subsystem 250 is shared among a plurality of NAS servers 120, the file access management table is managed by the meta-data management module 3221 of the NAS server management host 21. As a consequence, in this second embodiment, the FS management module 223 of each of the NAS servers 120 holds either a host name or an IP address of such an NAS server management host 210 in the case that the LU is shared between the own NAS server and another NAS server in addition to the information as explained in the first embodiment as an item of the file-mounted list, while this NAS server management host 210 manages this commonly shared LU. Also, the file access management table utilized in the meta-data management module 2231 of the NAS server 120 is also held and managed in the meta-data management module 3221.

The control module 324 sets up the NAS server management host 210 which is requested by the NAS server 120.

In this second embodiment, since other hardware constructions are identical to those of the first embodiment, explanations thereof are omitted.

The setup operation of the NAS server in this second embodiment may be carried out in a substantially similar manner to that of the first embodiment shown in FIG. 6. It should be understood that in this second embodiment, since the LU is shared, setup operation as to the shared file system within the LU is carried out among the NAS servers after the process operation defined in the step 614 (otherwise, step 616).

Concretely speaking, a selection is made by the manager as to whether or not the file system on the LU present in the data center 20 is shared. In the case that the file system on the LU of the data center 20 is not commonly shared, the setup process operation is ended. In the case that the file system is shared among the NAS servers 120, after the file system shared among the NAS servers 120 is set up, the setup process operation is ended.

Figure 11:
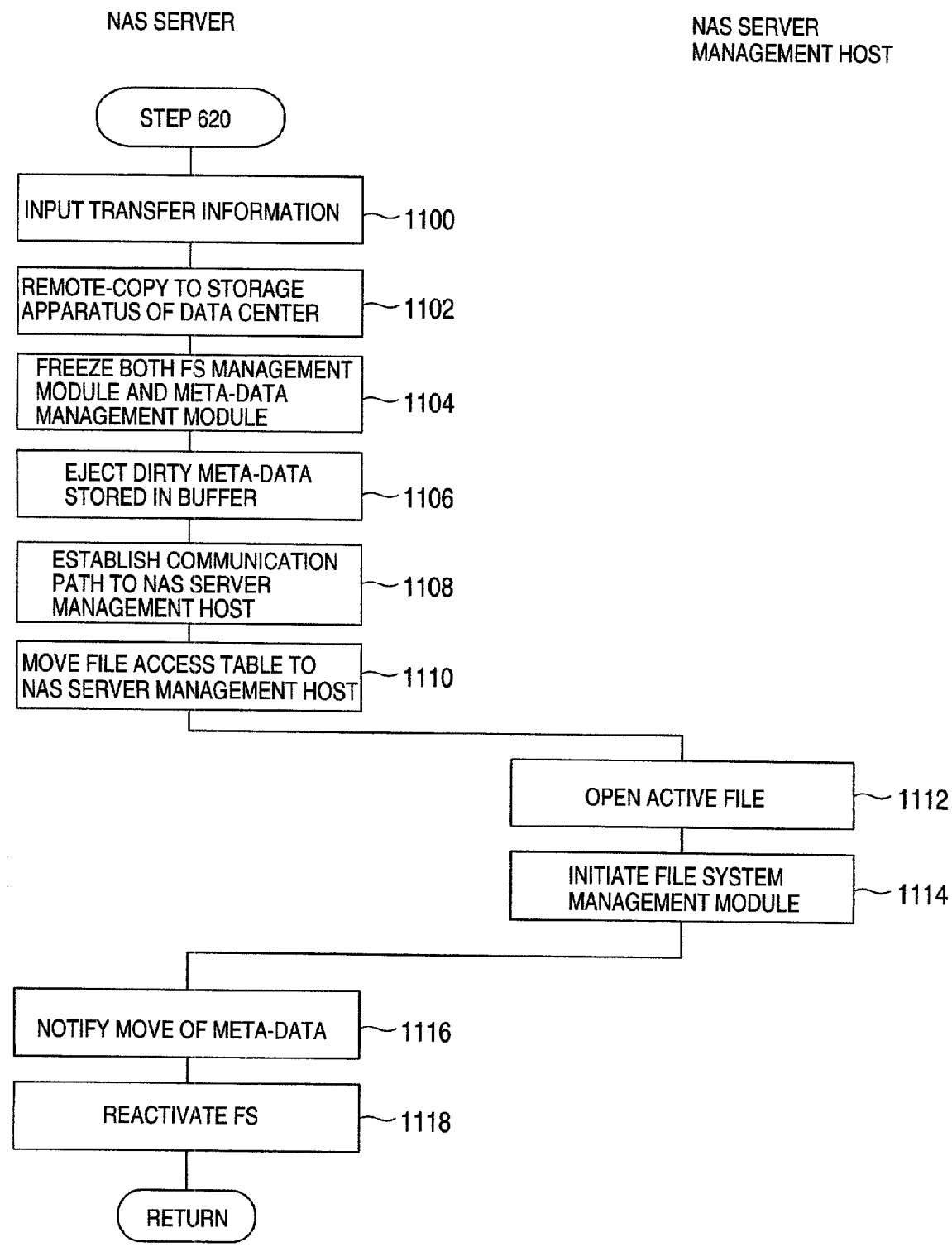
FIG. 11 is a flow chart for describing LU sharing process operations executed among NAS servers.

FIG. 11 is a flow chart for explaining a sequential operation for setting up that a file system within an LU is commonly shared among the NAS servers. Since this process operation is carried out, the management of the LUs shared among a plurality of NAS servers 120 is transferred to the NAS server management host 210.

The manager enters information related to a transfer of a file system which will be shared by a plurality of NAS servers with respect to the NAS server 120, while this NAS server 120 manages LUs (logical units) which store therein the file system shared by these plural NAS servers. The information related to the transfer contains a designation of LUs and a designation of file systems, which are shared (step 1100).

In such a case that the LU designated in the step 1100 is stored in the storage area of the storage apparatus 215 employed in the NAS server 120, a copy (duplication) of the selected LU is formed in the storage subsystem 250 employed in the data center 20. When a copy of an LU is formed, such a technique called as "remote copy" may be utilized. It should be understood that when the selected LU is equal to the LU formed in the storage subsystem 250, this copy process is omitted (step 1102).

Next, the operations of both the FS management module 223 and the meta-data management module 2231 employed in the NAS server 120 are temporarily stopped (frozen) (step 1104). Furthermore, the NAS server 120 ejects into a predetermined area within the LU, the meta-data which is stored into the file system buffer employed in the FS management module 223, and contains i-node information (file management information) related to the changed file. After this eject process operation of the meta-data has been completed, the NAS server 120 stops the duplication of the LU executed in the step 1102 (step 1106).

The NAS server 120 establishes a communication path between the own NAS server 120 and the NAS server management host 210 which transfers the management of the file. A process operation for establish the communication path is carried out in a similar manner to the process operation for establishing the communication path between the NAS server 120 and the storage subsystem 250, as explained in FIG. 8 (step 1108). When the communication path between the own NAS server 120 and the NAS server management host 210 is secured, this NAS server 120 transmits to the NAS server management host 210, such information related to a file which is shared with another NAS server 120 among the information contained in the file access management table (step 1110).

The NAS server management host 210 refers to the information of the received file access management table, and opens such a file which becomes active (step 1112). Subsequently, the NAS server management host 21 initiates the FS management module 322 so as to commence the operation of the file system (step 1114).

In the NAS server 120, the meta-data management 2231 transfers the meta-data related to the shared file to the NAS server management host 210, and notifies such a fact that the management is transferred to the FS management module 223 (step 1116). Upon receipt of the notification sent from the meta-data management module 2231, the FS management module 223 activates the process operation (step 1118).

After the process operation has been activated, when the file operation is carried out in response to the file operation of the PC 110, the FS management module 223 transmits a command related to the file operation to the meta-data management module 3221 of the NAS server management host 210, is communicated with the storage subsystem 250 by employing the block device protocol, and transfers the data of the file. After a series of the above-explained process operations is carried out, the file can be shared among the NAS servers 120.

Figure 17:
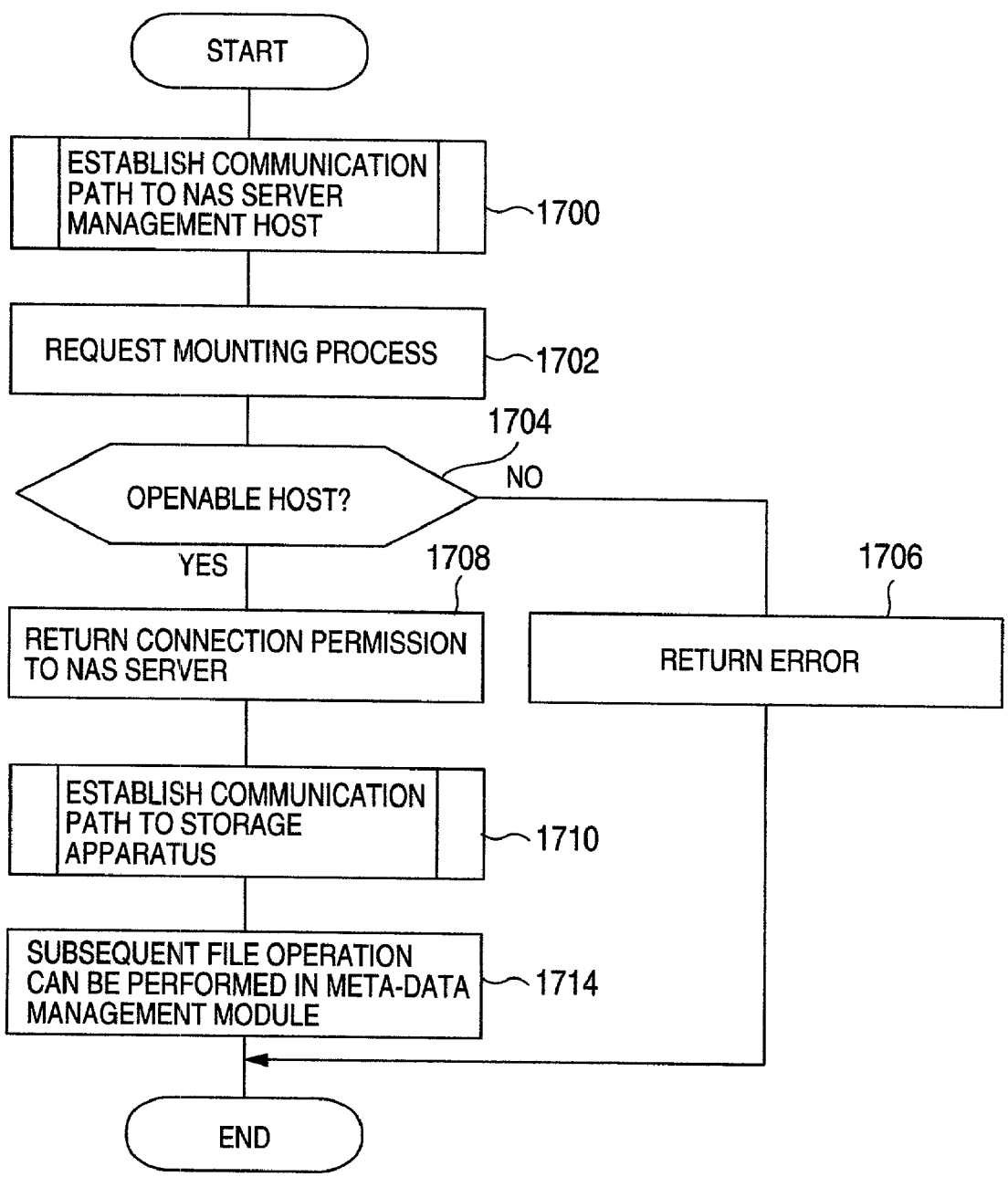
FIG. 17 is a flow chart for describing process operations executed in the case that a file managed by the NAS server management host can be utilized by a new NAS server.

FIG. 17 is a flow chart for explaining such a process operation which is executed in the case that an LU containing a file system managed by the NAS server management host 210 can be utilized from a new NAS server.

First, a communication path is secured, while this communication path is certified between the NAS server management host 210 and such an NAS server 120 which is newly connected. This process operation is carried out in a similar manner to the process operation as explained in FIG. 8 (step 1700).

After the communication path can be secured, the NAS server 120 requests the NAS server management host 210 to mount an LU which involves the file system to be connected (step 1702).

Upon receipt of the LU mount request issued from the new NAS server 120, the NAS server management host 210 checks as to whether or not this new NAS server 120 corresponds to such a server which is allowed to operate the file of the LU requested to be mounted. Concretely speaking, the NAS server management host 210 checks as to whether or not either a host name or an IP address is registered as a sharable NAS server in correspondence with a disk identifier of a file system management table. When the host name is set to the file system management table, operation of the subsequent file is allowed. When neither the host name, nor the IP address is not set to the file system management table, opening of the file is not allowed. In the latter case, an error is returned to the NAS server 120 in a step 1706, and then, the process operation is accomplished (step 1704).

When opening of the file is allowed, the NAS server management host 210 returns a response of a connection permission to the NAS server 120 (step 1706).

When the connection is allowed, the NAS server 120 now establishes another communication path certified between this NAS server 120 and the storage subsystem 250 having the LU to be connected in a similar manner to the above-explained step 1700 (step 1710).

Finally, the NAS server 120 requests the meta-data management module 3221 of the NAS server management host 210 to perform a file access control, so that operation of the subsequent file can be carried out (step 1714).

Since the above-described process operations are carried out, the file system present in the data center can be utilized by the new NAS server. When the utilization of the file system commonly shared by the NAS server 120 is stopped, after the operation for the file being used by the NAS server 120 is completed and the buffered data is saved to the LU containing the file system, the entry of this file system is deleted from the file system management table. Then, a process operation similar to the mounting process operation explained in the first embodiment is carried out in the NAS server management host 210.

A description will now be made of such a process operation which is carried out when a file operation is executed from the PC 110. It should be understood that since the LU may be shared between the NAS servers in this second embodiment, a process operation is carried out, the partial process of which is different from the process operation in the first embodiment. A different point from the file operation of the first embodiment will now be explained.

In an access process operation of a file according to this second embodiment, access process operations to be executed are made different from each other, depending upon such a fact that where the file system management information is managed. This file system management information is to manage "i-node", a super block, and a block of a file system. As a result, the process operation defined in the step 1202 of FIG. 12 is carried out as follows in this second embodiment. In other words, when the NAS server 120 accepts the access request from the PC 110, the NAS server 120 refers to a file system management place which has been registered in the file-mounted list in order to judge as to whether an LU to be accessed is managed by the meta-data management module 2231 employed in the NAS server 120, or the meta-data management module 3221 provided in the NAS server management host 210. This judgment process operation is carried out in the FS management module 223. In the case that the LU to be accessed is managed by the meta-data management module 2231 employed in the NAS server 120, the NAS server 120 executes a process operation similar to that of the first embodiment, as previously explained in the first embodiment.

Also, in the case that the LU to be accessed is managed by the meta-data management module 3221 of the NAS server management host 210, the FS management module 223 sends an access request to the meta-data management module 3221 of the NAS server management host 21 so as to request an access permission to a file.

When the meta-data management module 3221 of the NAS server management host 210 receives an access request issued from the FS management module 322 of the NAS server 120, this meta-data management module 3221 basically executes a similar process operation to that of the meta-data management module 2231 of the NAS server 120, as previously explained with reference to FIG. 13 to FIG. 16, in each of an opening process operation of a file, a reading process operation of file data, a writing process operation of file data, and also a closing process operation of a file. It should also be understood that while the process operations shown in FIG. 13 to FIG. 16 are carried out, partial process operations thereof are different in this second embodiment in order to share the file by a plurality of NAS servers.

Concretely speaking, in the opening process operation of the file, in the step 1300 of FIG. 13, when a file opening request is received from the NAS server 120 on the side of the NAS server management host 210, this NAS server management host 210 judges as to whether or not an access to the relevant file system is allowed with respect to the NAS server 120 as the opening request source. This judgement is carried out in such a manner that while the NAS server management host 210 refers to the file system management table, this NAS server management host 210 judges as to whether or not either a host name of the opening request source NAS server 120 or an IP address thereof is registered as an NAS server whose access is allowed. In the case that the access to the file system by the NAS server as the opening request source is allowed, the NAS server management host 210 continues to execute the subsequent opening process operations. If not, then the NAS server management host 210 interrupts this opening process operation as an error.

When the reading process operation of the file data is carried out, in the step 1404 of FIG. 14, the meta-data management module 3221 judges as to whether or not a file is shared between the own NAS server 120 and another NAS server 120 with reference to the file access management table. In the case that the file is shared between these NAS servers, the meta-data management module 3221 executes the previously-explained process operations in the first embodiment, and furthermore, requests to write the buffered data with respect to another NAS server in the step 1406 so as to guarantee consistency of the file data.

When the writing process operation of the file data is carried out, in the step 1504 of FIG. 15, the meta-data management module 3221 judges as to whether or not a file is shared between the own NAS server 120 and another NAS server 120 in a similar manner executed when the above-described file data is read. In the case that the file is shared between these NAS servers, the meta-data management module 3221 requests to write the buffered data with respect to another NAS server in the step 1506.

When the file is closed, in such a case that the file is shared between the own NAS server and another NAS server, the meta-data management module 3221 delets such information related to the NAS server functioning as the close request source from the relevant record in the step 1604 instead of the deletion of this relevant record, so that the record itself is left. It should also be noted that this relevant record is deleted when the NAS server which uses the file disappears.

Also, it should be noted that in this second embodiment, the NAS server management host is installed in the data center, and is connected via the wide area network to the NAS server. Alternatively, such an NAS server management host may be installed in any one of in-home computer systems. In this alternative case, an NAS server of this in-home computer system is connected via a LAN to the NAS server management host.

In accordance with the previously-explained embodiments, the users of the PCs operated on the different computer systems can share a single file via the file system stored in the storage subsystem provided on the wide area network, which is applied from the NAS server.

It should be further understood by those skilled in the art that the foregoing description has been made on embodiments of the invention and that various changes and modifications may be made in the invention without departing from the spirit of the invention and the scope of the appended claims.

What is claimed is:

1. A storage system comprising:
   a first storage apparatus providing a first logical unit for storing file data in a block-based format;
   a first server able to access a local second logical unit, said first server configured to transfer the file data from the local second logical unit over a wide area network to the first logical unit to make the file data available for sharing;
   a management server for holding both a storage location of the file data stored in said first logical unit of said first storage apparatus and management information used to manage access to said file data in said first logical unit, said management information being transferred from said first server to said management server in conjunction with the transfer of the file data to the first logical unit, said management information identifying the file data available for sharing with other servers and the other servers allowed to share the file data; and
   a first computer in communication with a second server through a local area network, said second server being configured to accept a first file-based operation request directed to the file data available for sharing via the local area network from the first computer, and send by way of the wide area network a corresponding second file-based operation request to said management server to access said file data in said first logical unit in said first storage apparatus;
   wherein said management server, upon determining from said management information transferred from said first server that said second server is one of said other servers permitted to access said file data available for sharing on said first logical unit, establishes a communication path over said wide area network with said second server;
   wherein when said first server and said second server are sharing said file data and are storing any of said file data as buffered data at said first server or said second server, management server requests said first server and said second server to write the buffered data into said first storage apparatus;
   wherein said file data available for sharing contained within said first logical unit is accessed by said management server using a block-based protocol in response to said second file-based operation request;
   wherein said management server responds to said second server using a file-based operation response, wherein said file data is shared by said first server and said second server through said wide area network.

2. A storage system as claimed in claim 1, further comprising a second storage apparatus connected to said second server, said second server including a file information for determining whether the first file-based operation request pertains to said shared first logical unit managed by said management server in said first storage apparatus, or to a third logical unit managed by said second server in said second storage apparatus.

3. A storage system as claimed in claim 2, further comprising a third storage apparatus in communication with said first server, said local second logical unit being maintained by said third storage apparatus, wherein said first server is configured to copy said file data from said third storage apparatus to said first logical unit, said first server further being configured to copy metadata for said file data to said first logical unit.

4. A storage system as claimed in claim 2, wherein said first and second servers are connected via respective first and second security protection apparatuses over the wide area network to a third security protection apparatus connected to said first storage apparatus and said management server, whereby communications over said wide area network between said first and second servers, said management server and said first storage apparatus are encrypted.

5. A storage system comprising:
   a first storage apparatus, said first storage apparatus including a first logical unit;
   a first server able to access a local second logical unit, said first server configured to transfer file data from the local second logical unit over a wide area network for storage in the first logical unit to make the file data available for sharing over the wide area network;
   a second server connected to a computer through a local area network and connected to said first storage apparatus via the wide area network, said second server accepting a first file-based operation request from the computer via the local area network for targeting the file data in said first logical unit in said first storage apparatus; and
   a management server connected via said wide area network to said first server apparatus and said second server apparatus, said management server storing both a storage position of the file data stored in the first logical unit in the first storage apparatus and management information for managing access to the file data, said management server receiving said management information from said first server in conjunction with the transfer of the file data to the first logical unit, said management information identifying other servers permitted to share the file data;
   wherein said management server, upon determining from said management information that said second server is one of said other servers permitted to access said first logical unit, establishes a communication path over said wide area network with the second server;
   wherein said second server is configured to send a second file-based operation request to said management server corresponding to said first file-based operation request, and said file data contained within said first logical unit is accessed by said management server using a block-based protocol in response to said second file-based operation request;
   wherein when said first server and said second server actively share said file data and store any of said file data as buffered data at said first server or said second server, management server requests said first server and said second server to write the buffered data into said first storage apparatus;
   wherein said file data contained within said first logical unit is shared by said first server and said second server through said wide area network.

6. A storage system as claimed in claim 5, further comprising:

a second storage apparatus locally connected to said second server, said second server including a file information for determining whether the first file-based operation request pertains to said first logical unit managed by said management server in said first storage apparatus, or to a third logical unit managed by said second server in said second storage apparatus.

7. A storage system as claimed in claim 6 further comprising a third storage apparatus in communication with said first server, said local second logical unit being maintained by said third storage apparatus, wherein said first server is configured to copy said file data from said third storage apparatus to said first logical unit, said first server further being configured to copy metadata for said file data to said first logical unit.

8. A storage system as claimed in claim 5 wherein:

said management server and said first storage apparatus are connected to a first security protection apparatus which communicates over said wide area network with a second security protection apparatus connected to said second server, whereby communications over said wide area network between said second server and said management server and said first storage apparatus are encrypted.

9. A storage system as claimed in claim 5 wherein:

said first storage apparatus comprises a disk apparatus comprising logical units using iSCSI protocol as a block device protocol, and wherein said management server determines block positional information indicative of a range of file data to be read out by referring to i-node information maintained by said management server to enable access to the file data in the first logical unit after said management server takes over management of the file data in the first logical unit.

10. A storage system comprising:

a first storage apparatus, said first storage apparatus including a first logical unit;

a second storage apparatus for storing first file data in a second logical unit;

a first server connected locally to said second storage apparatus, said first server holding storage location information of the first file data in said second logical unit in said second storage apparatus and connected via a wide area network to said first storage apparatus;

a management server connected via said wide area network to said first server apparatus, said first server apparatus sending to said management server said first file data for storage in said first logical unit and also sending to said management server in conjunction with said first file data management information for said first file data, said management information identifying other servers allowed to share the first file data, whereby management of said first file data is transferred to said management server; and a second server connected via said wide area network to said management server, said second server being one of said other servers allowed to share said first file data, and being configured to send to said management server a file-based operation request targeting said first file data on said first logical unit, said file-based operation request being received from a computer in communication with said second server;

wherein said management server, upon determining from said management information transferred from said first server that said second server is permitted to access said first file data on said first logical unit, establishes a communication path over said wide area network with the second server;

wherein said management server is configured to receive said file-based operation request from said second server, and access said file data contained within said first logical unit using a block-based protocol in response to said file-based operation request;

wherein when said first server and said second server actively share said file data and store any of said file data as buffered data at said first server or said second server, management server requests said first server and said second server to write the buffered data into said first storage apparatus;

wherein said file data contained within said first logical unit is shared by said first server and said second server through said wide area network.

11. A storage system as claimed in claim 10, wherein said first server is connected to said wide area network via a first security protection apparatus, said second server is connected to said wide area network via a second security protection apparatus, and said management server and said first storage apparatus are connected to said wide area network via a third security protection apparatus, whereby communications over said wide area network between said first and second servers, said management server and said first storage apparatus are encrypted.

12. A storage system as claimed in claim 10, wherein said first storage apparatus comprises a disk apparatus comprising logical units using iSCSI protocol as a block device protocol, and wherein said management server determines block positional information indicative of a range of file data to be read out by referring to i-node information maintained by said management server to enable access to the file data in the first logical unit after said management server takes over management of the file data in to the first logical unit.

* * * * *